United States Patent [19]

Kusaka et al.

[11] Patent Number: 5,321,515
[45] Date of Patent: Jun. 14, 1994

[54] IMAGE FLUCTUATION CORRECTING APPARATUS

[75] Inventors: Hiroya Kusaka, Kawanishi; Takashi Sakaguchi, Kyoto; Masaaki Nakayama, Hirakata, all of Japan

[73] Assignee: Matsushita Electric Industrial Co., Ltd., Osaka, Japan

[21] Appl. No.: 894,741

[22] Filed: Jun. 5, 1992

[30] Foreign Application Priority Data

Jun. 10, 1991 [JP] Japan .................................. 3-137417
Dec. 25, 1991 [JP] Japan .................................. 3-342661

[51] Int. Cl.$^5$ ............................................ H04N 5/232
[52] U.S. Cl. ....................................... 348/208; 348/416
[58] Field of Search ............................... 358/105, 222; H04N 5/232

[56] References Cited

U.S. PATENT DOCUMENTS 4,837,632 6/1989 Kubo ..................................... 358/222
5,060,074 10/1991 Kinugasa ............................... 358/222
5,138,445 8/1992 Ueda ..................................... 358/105

Primary Examiner—Howard W. Britton
Attorney, Agent, or Firm—Stevens, Davis, Miller & Mosher

[57] ABSTRACT

An image fluctuation correcting apparatus for correcting image fluctuations without using a field memory by providing an image fluctuation predicting circuit for predicting image fluctuation in a succeeding field from the image fluctuation determined in a preceding field and moving signal read addresses of a solid state image pickup device in accordance with the predicted value. In another image fluctuation correcting apparatus, movements of an image pickup apparatus are detected by using an acceleration detecting circuit to thereby predict image fluctuation in a succeeding field by a predicting apparatus on the basis of the detected movement of the image pickup apparatus for correcting the image fluctuation.

15 Claims, 13 Drawing Sheets

F I G. 8
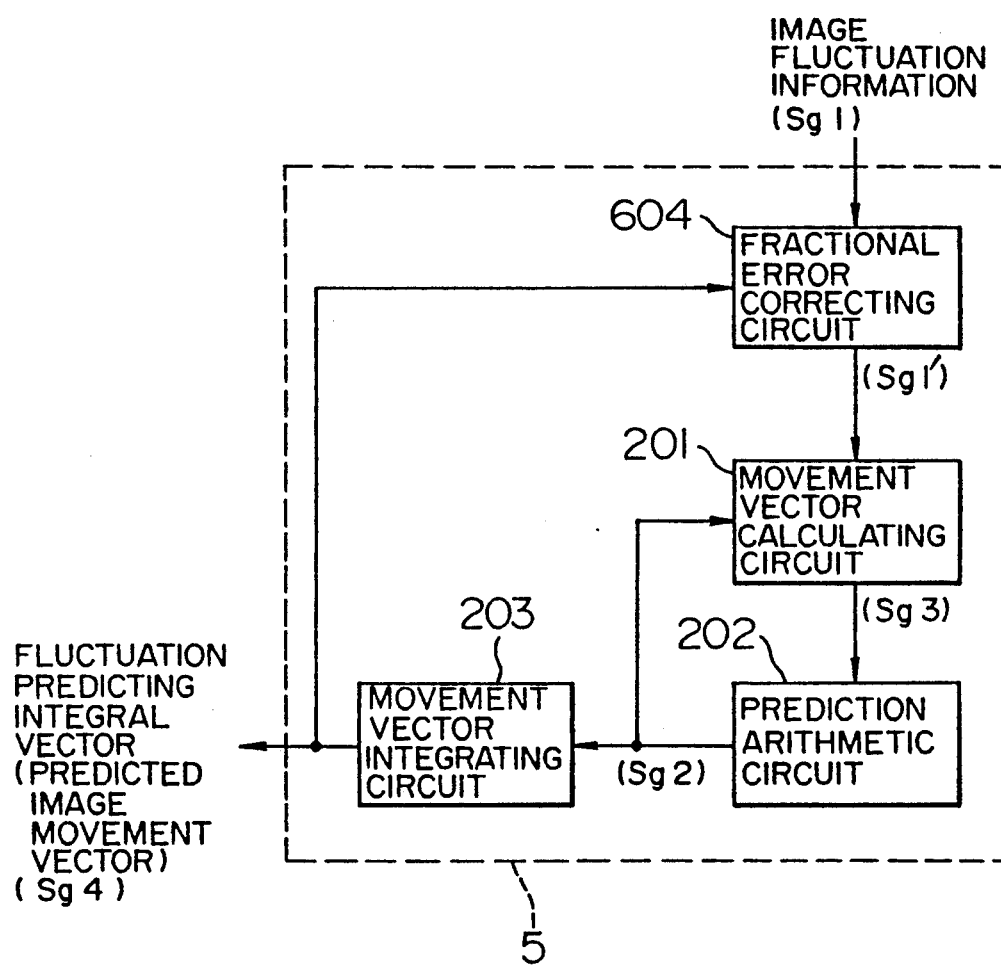

IMAGE FLUCTUATION CORRECTING APPARATUS

BACKGROUND OF THE INVENTION

1. Field of the Invention

The present invention relates to an image fluctuation correcting apparatus used for correcting movements, drifts or fluctuation (hereinafter collectively referred to as fluctuations) of pictures or images generated by an image pickup apparatus such as a video camera or the like due to swing, shaking or like movements of the image pickup apparatus which may accompany manipulation thereof.

Recently, in the field of image pickup apparatuses such as video cameras and the like, remarkable progress has been made in implementation of such apparatus having a small size and light weight with a zoom function of high magnification. Besides, the image pickup apparatuses tend to be increasingly used by people of all ages and both sexes. Besides, automatic correcting functions such as auto-focussing function, automatic whitebalance control and automatic luminance control of improved performance have been developed and adopted in many of the commercially available products. On the other hand, there has arisen a problem that image fluctuations occur due to movements of the apparatus, as a result of which the quality of pictures as generated is degraded to great disadvantage. Under the circumstances, there exists a great demand for automatic correction of the image fluctuation.

2. Description of the Prior Art

As a typical method of correcting the image fluctuation, there may be mentioned a method according to which fluctuation of image or picture is detected from picture signals after having taken pictures, wherein positional correction of images or pictures is performed on the basis of the fluctuation information as detected. (Reference may be made to "Technical Reports, Vol. 11, No. 3" published by The Institute of Television Engineers of Japan in May 1987.) More specifically, the picture signal suffering from the image fluctuation undergoes first an analogue-to-digital (A/D) conversion to be subsequently separated into two series, one of which is supplied to a Y/C separation circuit to extract only the Y-signal which is then supplied to a vector detecting circuit. The vector detecting circuit in turn serves for a function to generate an optimum correction vector while being controlled with regard to the area from which the movement vector is to be detected.

As another method of correcting the image fluctuation, it has also been proposed to detect the movements of the image pickup apparatus by means of an angular acceleration sensor to thereby control the position of an imaging unit including an optical system so as to compensate for the movement of the image pickup apparatus. (Reference may be made to "Technical Reports, Vol. 11, No. 2" published by the Institute of Television Engineers of Japan in Nov. 1987.)

Finally, there may be mentioned an image fluctuation correcting method according to which image fluctuation is detected from the picture signal during the image pickup operation for effecting positional correction of the image on the basis of the fluctuation information thus detected, to thereby eliminate the fluctuation. (Reference may be made to IEEE Transactions on Consumer Electronics, Vol. 36, No. 3, August 1990.)

With the methods and systems mentioned above, a field memory or a frame memory is indispensably required when the image fluctuation is to be detected through electronic processing. On the other hand, detection of movements of the image pickup apparatus with the aid of the angular acceleration sensor requires indispensably a position control unit for controlling the imaging unit so as to cancel out or compensate for the movement of the associated image pickup apparatus.

SUMMARY OF THE INVENTION

It is therefore a main object of the present invention to provide a novel and improved image fluctuation correcting apparatus which is capable of effectively correcting or canceling out image fluctuations to thereby allow pictures to be taken and generated with high quality without the need for the use of an expensive field memory or frame memory.

In view of the above and other objects which will become apparent as the description proceeds, there is provided according to a first aspect of the present invention an image fluctuation correcting apparatus which comprises an image fluctuation detecting circuit for detecting fluctuation of an input image supplied from a photoelectric conversion device (e.g. CCD) to thereby output the detected fluctuation as image fluctuation information, an image fluctuation predicting circuit for predicting on the basis of the image fluctuation information supplied from the image fluctuation detecting circuit a predicted image fluctuation in a current field or alternatively a predicted image fluctuation in a succeeding frame, and a photoelectric conversion device control circuit for controlling signal read addresses of the photoelectric conversion device on the basis of the output of the image fluctuation predicting circuit, wherein the image fluctuation predicting circuit includes a movement vector calculating circuit for calculating a movement vector between a current field or frame and a preceding field or frame on the basis of the image fluctuation information obtained from the image fluctuation detecting circuit and the predicted value of the image fluctuation (predicted image movement vector) predicted by a prediction arithmetic circuit one field or one frame before, the prediction arithmetic circuit calculating a predicted image movement vector of an immediately succeeding field or frame on the basis of the movement vector obtained from the movement vector calculating circuit, and a movement vector integrating circuit for integrating the predicted image movement vector obtained from the prediction arithmetic circuit to output an integral value resulting from the integration.

With the image fluctuation correcting apparatus according to the first aspect of the invention, the fluctuation of an image in a field or frame succeeding the current field or frame is predicted by the image fluctuation predicting circuit, wherein on the basis of the predicted value, picture signal read addresses for the photoelectric conversion device are changed correspondingly on a field-by-field basis or on a frame-by-frame basis so as to correct or compensate for the image fluctuation.

further, according to a second aspect of the present invention, there is provided an image fluctuation correcting apparatus for an image pickup apparatus, which comprises an image fluctuation detecting circuit for detecting fluctuation of images inputted from a photoelectric conversion device such as a CCD, an acceleration detecting circuit for detecting acceleration of movement of the image pickup apparatus to output acceleration information, a conversion circuit for obtaining converted acceleration information from the acceleration information, an image fluctuation predicting circuit for predicting on the basis of image fluctuation information obtained from the image fluctuation detecting circuit and the converted acceleration information an image fluctuation in a field or frame which succeeds to the current field or frame and a photoelectric conversion device control circuit for controlling signal read addresses of the photoelectric conversion device on the basis of the output from the image fluctuation predicting circuit, wherein the image fluctuation predicting circuit includes a movement vector calculating circuit for calculating a movement vector between a current field or current frame and a preceding field or preceding frame on the basis of the image fluctuation information obtained from the image fluctuation detecting circuit and the predicted value obtained from a prediction arithmetic circuit one field or one frame before, the prediction arithmetic circuit calculating a predicted image movement vector on the basis of the movement vector obtained from the movement vector calculating circuit and the converted acceleration information obtained from the conversion circuit, and a movement vector integrating circuit for integrating the predicted image movement vector obtained from the prediction arithmetic circuit to thereby output an integral value of the predicted image movement vector.

With the image fluctuation correcting apparatus according to the second aspect of the invention, acceleration of the image pickup apparatus derived from the output of the acceleration detecting circuit is utilized for predicting image fluctuation of a field or frame succeeding a current field or frame by the image fluctuation predicting circuit, wherein on the basis of the predicted value, the picture signal read addresses for the photoelectric conversion device are changed correspondingly on a field-by-field basis or on a frame-by-frame basis to thereby effectuate correction of the image fluctuation.

BRIEF DESCRIPTION OF THE DRAWINGS

FIG. 8 is a block diagram showing in concrete form a circuit configuration of the image fluctuation predicting circuit of the image fluctuation correcting apparatus according to a third embodiment implementing the first aspect of the invention;

DESCRIPTION OF THE PREFERRED EMBODIMENTS

Now, the present invention will be described in detail in conjunction with preferred or exemplary embodiments thereof by reference to the accompanying drawings.

Embodiment 1

A first embodiment of the invention is directed to a basic structure of an image fluctuation correcting apparatus which implementing a first aspect of the invention.

Figure 1:
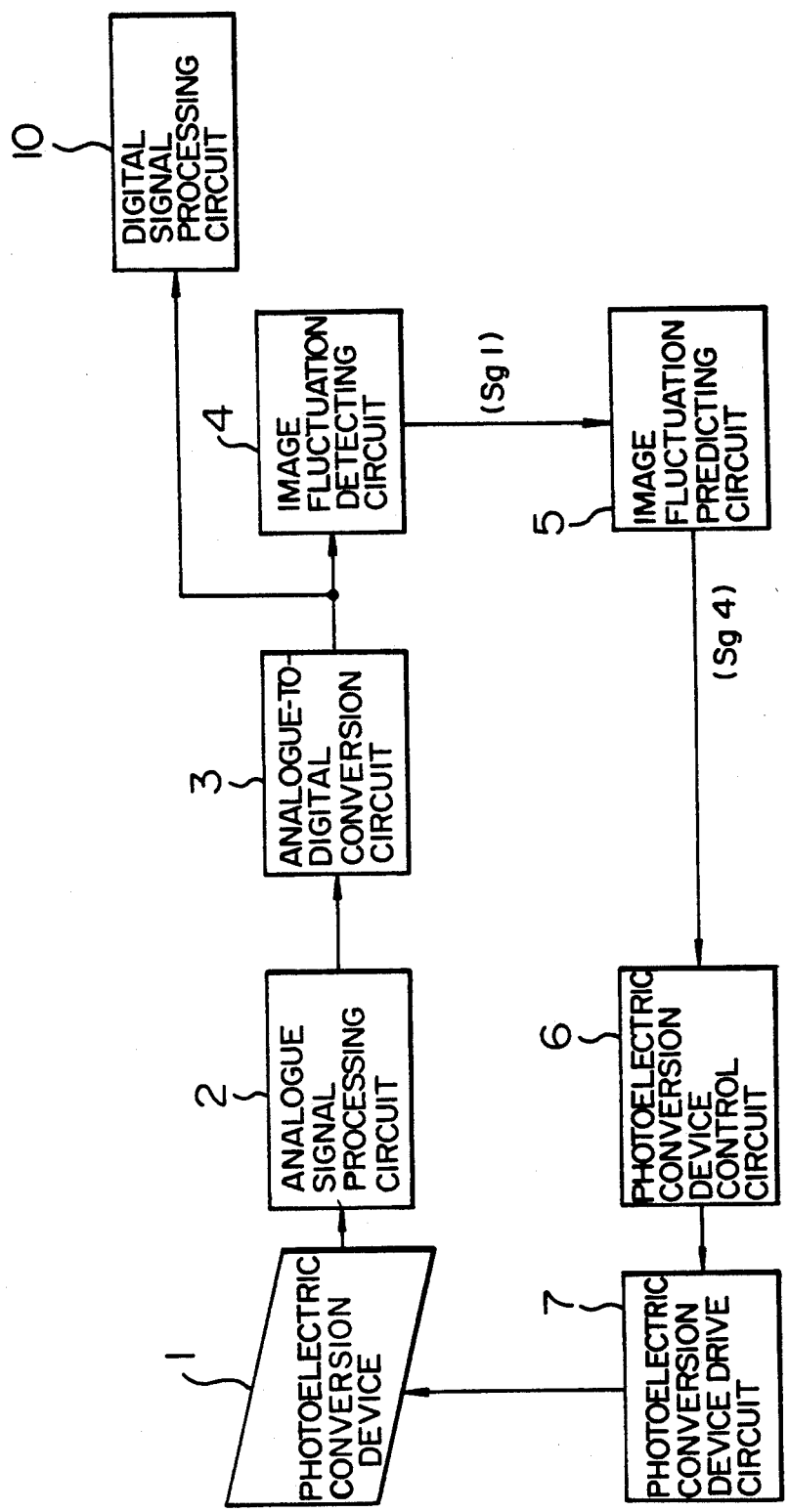
FIG. 1 is a block diagram showing a structure of the image fluctuation detecting apparatus according to a first embodiment implementing first aspect of the present invention.

Referring to FIG. 1 showing in a block diagram an image fluctuation (drift or the like) correcting apparatus according to the first embodiment of the invention, a reference numeral 1 denotes a photoelectric conversion device such as exemplified by a CCD or the like which is adapted to convert a picture picked up through an optical system of an image pickup apparatus (also known as the imaging device) into electric signals (hereinafter referred to as the picture signals). The picture signals outputted from the photoelectric conversion device 1 are supplied to an analogue signal processing circuit 2 to undergo signal processings such as an automatic gain correction (AGC), a gamma correction and other processings. The analogue picture signals outputted from the analogue signal processing circuit 2 are then supplied to an analogue-to-digital conversion circuit 3 to be thereby converted into corresponding digital signals, being then inputted to an image fluctuation detecting circuit 4 which serves to detect an inter-field image fluctuation (i.e., fluctuation or drift of image between successive fields) from the digital picture signals, which fluctuation may be brought about by swing, shaking, vibration or like movements of the image pickup apparatus. The fluctuation detection signal outputted from the image fluctuation detecting circuit 4 is inputted to an image fluctuation predicting circuit 5 as an image fluctuation information signal Sg1. The image fluctuation predicting circuit 5 predicts a fluctuation of an image in a succeeding field (i.e. field succeeding to the current field) on the basis of the image fluctuation information signal Sg1 supplied from the image fluctuation detecting circuit 4. A signal Sg4 outputted from the image fluctuation predicting circuit 5 and representing the image fluctuation as predicted is supplied to a control circuit 6 for controlling the photoelectric conversion device 1. The photoelectric conversion device control circuit 6 is designed to control addresses for reading out the picture signals from the photoelectric conversion device 1 on the basis of the predicted value of the image fluctuation obtained from the image fluctuation predicting circuit 5. At this juncture, it should be noted that in the case of a solid state image pickup apparatus known heretofore, the start address for reading a picture signal is determined fixedly. In contrast, in the case of the instant embodiment of the invention, the start address for reading out a picture signal is made variable. Besides, the picture signals are read out from a partial picture area of the image pickup apparatus in contrast to the conventional imaging device in which the picture signals are read out from the whole area, wherein the area from which the picture signals are to be read out is made variable by controlling the read start address by means of the photoelectric conversion device control circuit 6. In this manner, the image fluctuation correction which has heretofore been realized by changing the start address for reading the picture signal from a field memory can be realized by controlling the start address for reading out the picture signal from the solid state image pickup apparatus according to the teaching of the invention. A photoelectric conversion device drive circuit 7 serves for driving the photoelectric conversion device 1 under the control of the circuit 6. Finally, a digital signal processing circuit 10 is designed to perform various digital signal processings on the picture signals outputted from the analogue-to-digital conversion circuit 3 such as luminance signal separation, horizontal/vertical aperture correction, autoknee correction, chrominance signal separation, white balance correction, false color elimination, electronic zoom processing and others.

Figure 2:
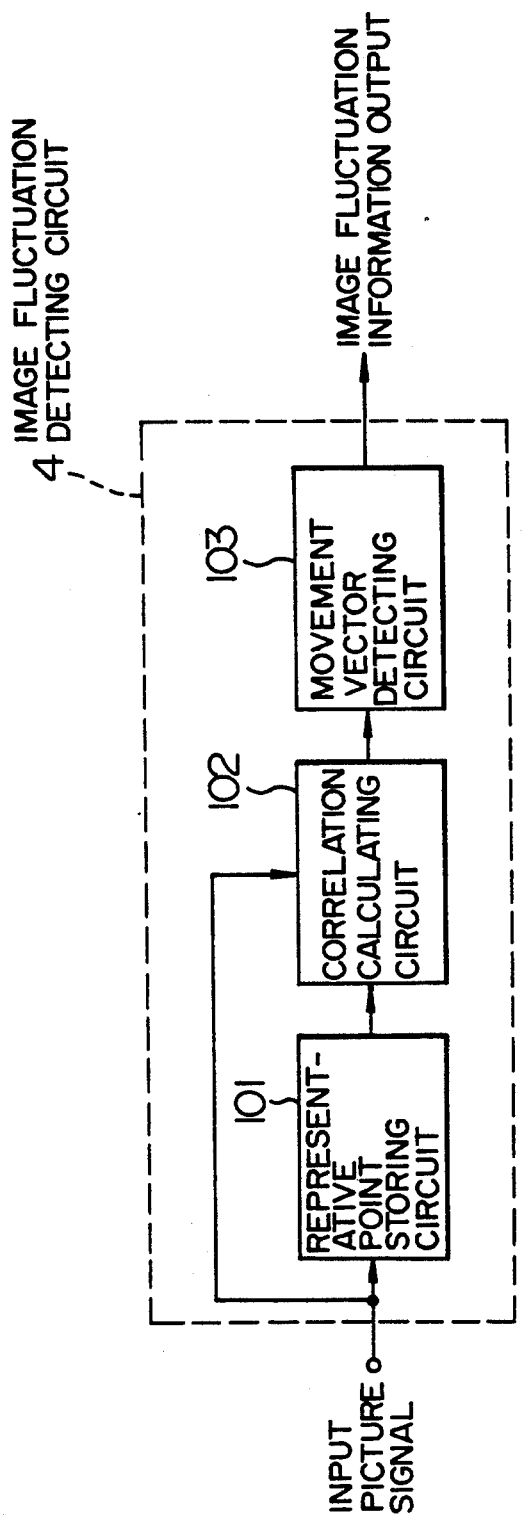
FIG. 2 is a block diagram showing an exemplary structure of an image fluctuation detecting circuit shown in FIG. 1.

FIG. 2 is a block diagram showing an exemplary structure of the image fluctuation detecting circuit 4 shown in FIG. 1. Referring to FIG. 2, a representative point storing circuit 101 divides a current field of the picture signals inputted from the photoelectric conversion device 1 into a plurality of areas, wherein picture signals corresponding to specific representative points in the areas resulting from the division are stored as representative point signals in a representative point storing circuit 101. The output of the representative point storing circuit 101 is supplied to a correlation calculating circuit 102 which determines arithmetically a correlation between the representative point signals of the preceding field and the picture signals of the current field to thereby determine the difference between the representative point signals of the preceding field and the picture signals of the current field. The output of the correlation calculating circuit 102 is supplied to a movement vector detecting circuit 103 which serves to detect information Sg1 concerning the image fluctuation making appearance between the preceding field and the current field on the basis of the result of the arithmetic operation performed by the correlation calculating circuit 102. Parenthetically, the image fluctuation detecting circuit 4 may be constituted by a known circuit used heretofore for the detection of the image fluctuation such as a circuit disclosed, for example, in K. Uomori et al: Automatic Image Stabilizing System by Full-Digital Signal Processing (IEEE Trans. Consum. Electron., Vol. 36, No. 3, pp. 510–519, Aug. 1990).

Figure 3:
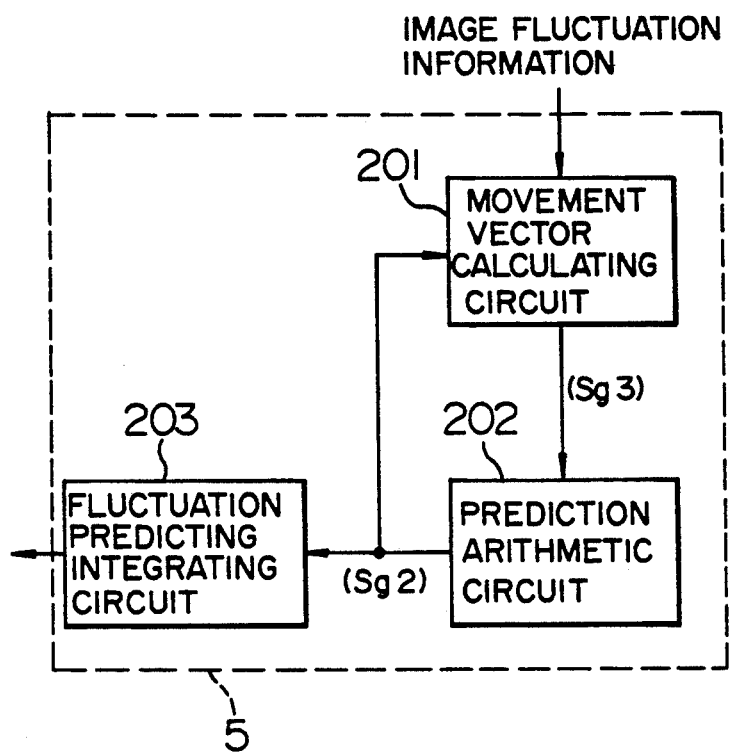
FIG. 3 is a block diagram showing an exemplary structure of an image fluctuation predicting circuit shown in FIG. 1.

FIG. 3 is a block diagram showing in concrete form an exemplary structure of the image fluctuation predicting circuit 5 shown in FIG. 1. Referring to the figure, a prediction arithmetic circuit 202 serves to predict a movement vector of a succeeding field (i.e. a field succeeding the current field) by a calculation on the basis of the movement vector determined up to the current field. Hereinafter, the movement vector of the succeeding field will be referred to as the image fluctuation predicting vector Sg2. The movement vector used currently is obtained by adding (or subtracting) the image fluctuation information Sg1 determined by the fluctuation detecting circuit 4 in each field to (or from) the image fluctuation predicting vector Sg2 determined by the prediction arithmetic circuit 202 for the field immediately preceding the current field. Thus, it can be said that the movement vector used herein represents the actual movement vector Sg3 for each field. The actual movement vector Sg3 for each field is calculated by the vector calculating circuit 201. More specifically, the vector calculating circuit 201 stores the image fluctuation predicting vector Sg2 outputted from the prediction arithmetic circuit 202 on a field-by-field basis and determines the actual inter-field movement vector Sg3 by using the image fluctuation predicting vector Sg2 and the image fluctuation information Sg1 outputted from the image fluctuation detecting circuit 4. The prediction arithmetic circuit 202 predicts the image fluctuation in the succeeding field by using the movement vector Sg3 determined by the movement vector calculating circuit 201, to thereby output the result as the image fluctuation predicting vector Sg2. A movement vector integrating circuit 203 integrates the image fluctuation predicting vector Sg2 outputted from the prediction arithmetic circuit 202 on a field-by-field basis. Hereinafter, the output of the movement vector integrating circuit 203 will be referred to as the fluctuation predicting integral vector Sg4.

Figure 4:
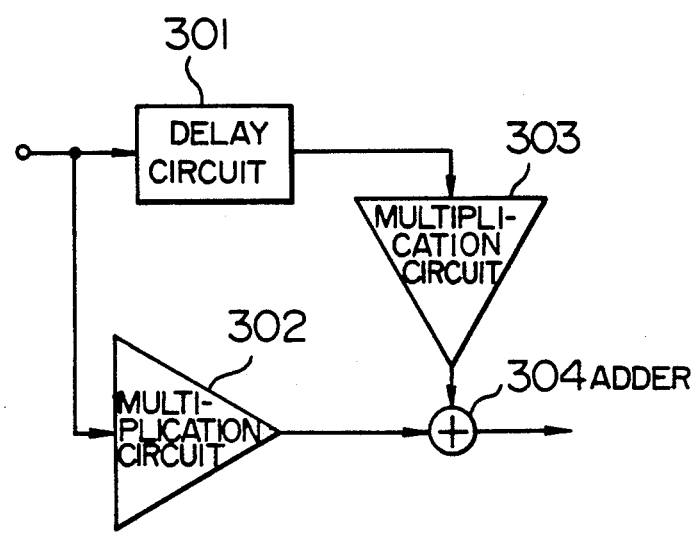
FIG. 4 is a block diagram showing an exemplary structure of a prediction arithmetic circuit shown in FIG. 3.

FIG. 4 is a block diagram showing an exemplary structure of the prediction arithmetic circuit 202 shown in FIG. 3. Referring to fIG. 4, a delay circuit 301 serves to delay the picture signal for a delay time which corresponds to one field of the picture signal, i.e. 1/60 sec. A multiplication circuit 302 multiplies the input thereto by "2". On the other hand, a multiplication circuit 303 is designed to multiply the input thereto by "−1". The outputs of the multiplication circuit 302 and 303 are added together by an adder 304.

Figure 5:
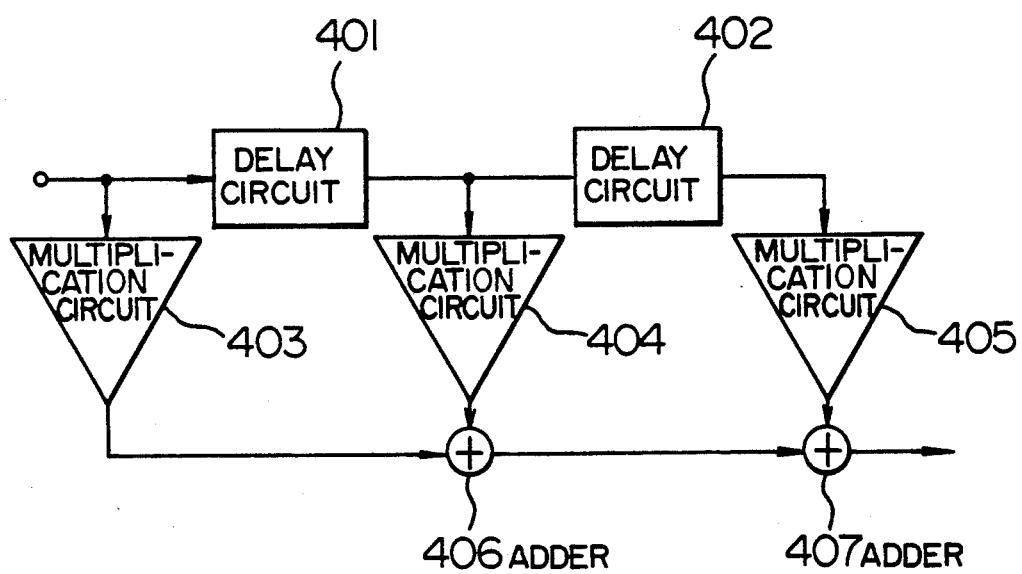
FIG. 5 is a block diagram showing another exemplary structure of the prediction arithmetic circuit shown in FIG. 3.

FIG. 5 is a block diagram showing another exemplary structure of the prediction arithmetic circuit 202. Referring to FIG. 5, each of delay circuits 401 and 402 serves to delay the picture signal by one field, i.e., 1/60 sec. A multiplication circuit 403 is constituted by a multiplier for multiplying the input thereto by "3". Similarly, a multiplier circuit 404 multiplies the input thereto by "3". Further, a multiplication circuit 405 multiplies the input thereto by "−1". Outputs of the multiplication circuits 403 and 404 are added together by an adder 406, while an adder 407 adds together the outputs of the multiplication circuit 405 and the adder 406, respectively.

Now, description will be turned to operations of the image fluctuation detecting apparatus of the structure described above.

In the image fluctuation detecting circuit 4, a correlation between the picture signals of a current field as outputted from the photoelectric conversion device 1 and the representative point signals of the preceding field picture signals which are stored in the representative point storing circuit 101 is determined by the correlation arithmetic circuit 102. On the basis of the result of this correlation, the image fluctuation is detected. In this conjunction, it should be noted that the image fluctuation information Sg1 thus obtained represents a difference between the image fluctuation which has been predicted by the image fluctuation predicting circuit 5 in the preceding field and the actual image fluctuation of the current field. Consequently, when the fluctuation predicted by the image fluctuation predicting circuit 5 is the same as the actual image movement, the amount of the image fluctuation determined by the image fluctuation detecting circuit 4 is zero. The image fluctuation data Sg1 detected by the image fluctuation detecting circuit 4 is added to (or subtracted from) the image fluctuation predicting vector Sg2 determined by the vector calculating circuit 201 in the preceding field, wherein the result of this addition (or subtraction) is supplied to the prediction arithmetic circuit 202 as the actual movement vector Sg3 of the current field relative to the preceding field. The prediction arithmetic circuit 202 then determines an image fluctuation predicted for a succeeding field on the basis of the data Sg3 inputted from the vector calculating circuit 201, wherein the predicted image fluctuation is supplied to the movement vector integrating circuit 203 as the image fluctuation predicting vector Sg2.

In this conjunction, the prediction arithmetic circuit 202 may be implemented in such a structure as to determine as the image fluctuation predicting vector Sg2 the actual movement vector Sg3 of the current field relative to the preceding field as determined by the movement vector calculating circuit 201. With this structure, low-frequency components brought about by swing of the image can be eliminated. As a second structure of the prediction arithmetic circuit 202, this circuit 202 may be implemented such as shown in FIG. 3. In this case, the input signal multiplied by "2" in the multiplication circuit 302 and the input signal delayed through the delay circuit 301 and multiplied by "−1" in the multiplication circuit 303 are added together by the adder 304, the sum of which is delivered as the image fluctuation predicting vector Sg2. As a third structure, the prediction arithmetic circuit 202 may be implemented such as shown in FIG. 4. In this case, the input signal multiplier by "3" in the multiplicating circuit 403 and the input signal delayed through the delay circuit 401 and multiplied by "−3" in the multiplication circuit 404 are added together by an adder 406. The output of the adder 406 is then added with the input signal delayed through the delay circuits 401 and 402 and multiplied by "5" in the multiplication circuit 405 by the adder 407, wherein the output of the adder 407 is utilized as the image fluctuation predicting vector Sg2. With the second and third structures of the prediction arithmetic circuit 202, higher frequency components involved in the swing of the image can be eliminated when compared with the first structure in which the actual movement vector Sg3 in the current field relative to the preceding field is outputted directly as the image fluctuation predicting vector Sg2.

By using the image fluctuation prediction vector Sg2 described above, the movement vector integrating circuit 203 determines an integral value Sg4 of the image fluctuation predicting vectors Sg2 obtained on a field-by-field basis. The fluctuation predicting integral vector Sg4 thus determined is supplied to the photoelectric conversion device control circuit 6, which then controls the start address for reading the picture signals on the photoelectric conversion device 1 on the basis of the fluctuation predicting integral vector Sg4 to thereby change correspondingly the area of the photoelectric conversion device 1 from which the picture signals are to be read out. In this way, the image fluctuation component ascribable to the movement of the image pickup apparatus can be corrected directly on the photoelectric conversion device 1 itself.

As will be appreciated from the above description, it is possible to correct the image fluctuation without using the field memory circuit by changing the start address for reading out the signals on the photoelectric conversion device 1 in accordance with the predicted integral vector Sg4 for a succeeding field, which vector is predicted by the movement vector predicting circuit 5.

It is also apparent that the functions of the individual circuits constituting the image fluctuation correcting apparatus according to the first embodiment can equally be realized by using a software technique.

In case a photoelectric conversion device having a number of pixels conforming to the NTSC standards are employed in the instant embodiment to thereby obtain the final picture signals which are compatible with the NTSC system, the digital signal processing circuit 10 has to be so implemented as to realize the zoom function through electronic processing to thereby perform zoom processing on the picture signals outputted from the solid state image pickup apparatus so as to meet the standards of the NTSC system, because the image fluctuation correction is performed not by reading the picture signals from the whole picture area but by reading the picture signals from a portion of the picture area of the solid state image pickup apparatus according to the instant embodiment of the invention. Further, it is conceivable to use the photoelectric conversion device having a number of pixels conforming to the PAL standards. In this case, the digital signal processing circuit has to be imparted with a corresponding electronic zoom function in order that the picture signals available ultimately can be utilized as the picture signals for the PAL system. Further, in view of the fact that the pixel number of the PAL system is greater than that of the NTSC system, it may be preferred to use the solid state image pickup apparatus having a greater number of pixels than those of the PAL system and the NTSC system so that the finally obtained picture signals can be made compatible with the PAL standards and the NTSC standard without the need for electronic zoom processing.

Although no description has been made concerning the accuracy of the image fluctuation information Sg1 detected by the image fluctuation detecting circuit 4, the image fluctuation prediction vector Sg2 predicted by the image fluctuation predicting circuit 5 and the fluctuation predicting integral vector Sg4 obtained by the movement vector integrating circuit 203, it should be understood that the accuracy on the order of one pixel or less can be realized by resorting to the conventional technique. To this end, the digital signal processing circuit 10 may be so implemented as to have a picture signal interpolating function so that the picture signals corrected in respect to the fluctuation with an accuracy equivalent to one pixel or less through the interpolating processing can be generated on the basis of the fluctuation predicting integral vector Sg4 mentioned above.

In the above description of the first embodiment of the invention, it has been assumed that the image fluctuation detecting circuit 4 is constituted by a circuit known heretofore. It should however be understood that the invention is not restricted to the use of such known image fluctuation detecting circuit 4.

furthermore, concerning the prediction arithmetic circuit 202, it has been described that this circuit can be implemented in three different structures independent of one another. However, such configuration of the prediction arithmetic circuit 202 may equally be adopted in which the results of arithmetic operations performed by these three different structures are adaptably changed over to one another. In this conjunction, in the third structure of the prediction arithmetic circuit 202 shown in FIG. 4, two adders are used. It is however obvious that substantially the same effect can be attained even when only one adder is used.

Although it has been described that detection of the image fluctuation and prediction thereof are performed on a field basis, the invention is not limited to this concept. Detection of the image fluctuation as well as the prediction thereof may also be performed on a frame-by-frame basis to substantially the same effect.

Embodiment 2

Now, a second embodiment of the image fluctuation correcting apparatus which implements the first aspect of the present invention will be described. The second embodiment of the image fluctuation correcting apparatus differs from the first embodiment only in respect to the image fluctuation predicting circuit 5 shown in FIG. 1. In other words, except for the image fluctuation predicting circuit 5, the components of the second embodiment are the same as those of the first embodiment. Accordingly, these same components are denoted by like reference symbols as those used in fIG. 1 and repeated description is omitted. Thus, the following description will be made with emphasis put on the circuit arrangement which differs from the first embodiment.

Figure 6:
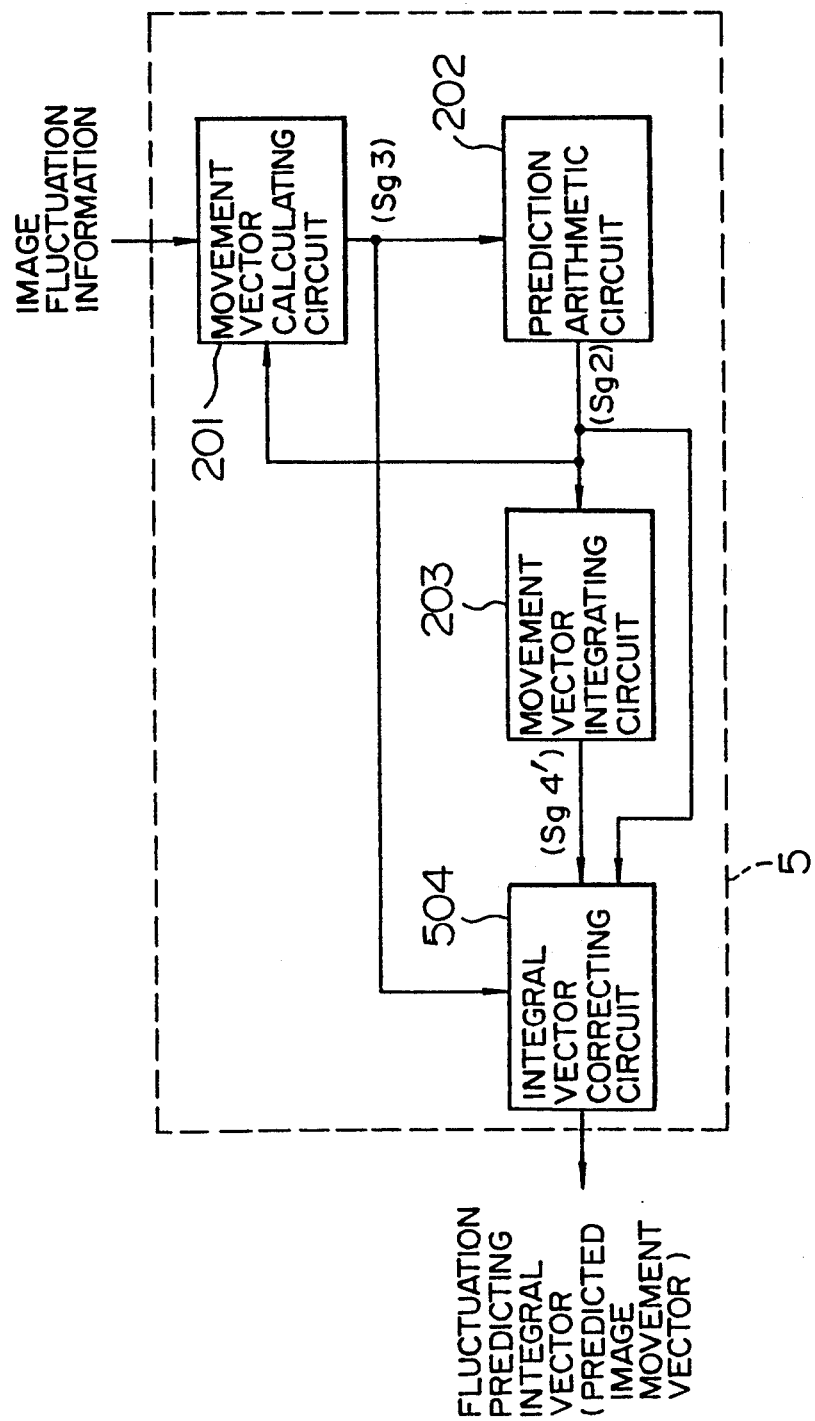
FIG. 6 is a block diagram showing a circuit configuration of the image fluctuation predicting circuit of the image fluctuation correcting apparatus according to a second embodiment implementing the first aspect of the present invention.

FIG. 6 is a block diagram showing in concrete form a circuit configuration of the image fluctuation predicting circuit 5 of the image fluctuation correcting apparatus according to the second embodiment of the invention. The image fluctuation predicting circuit 5 according to the instant embodiment differs from that of the first embodiment in that an integral vector correcting circuit 504 is additionally provided. The integral vector correcting circuit 504 has inputs supplied with the outputs Sg3, Sg4' and Sg2 of the movement vector calculating circuit 201, the movement vector integrating circuit 203 and the prediction arithmetic circuit 202, respectively.

In fIG. 6, the prediction arithmetic circuit 202 serves to predict a movement vector of a succeeding field (i.e. a field succeeding the current field) by calculation on the basis of the movement vector determined up to the current field. Hereinafter, the movement vector of the succeeding field will be referred to as the image fluctuation predicting vector Sg2. The movement vector used currently is obtained by adding (or subtracting) the image fluctuation information Sg1 determined by the fluctuation detecting circuit 4 in each field to (or from) the image fluctuation predicting vector Sg2 determined by the prediction arithmetic circuit 202 for the field immediately preceding the current field. Thus, it can be said that the movement vector used herein represents the actual movement vector Sg3 for each field. The actual movement vector Sg3 for each field is calculated by the vector calculating circuit 201. More specifically, the vector calculating circuit 201 stores the image fluctuation prediction vector Sg2 outputted from the predicting arithmetic circuit 202 on a field-by-field basis and determines the actual inter-field movement vector Sg3 by using the image fluctuation predicting vector Sg2 and the image fluctuation information Sg1 outputted from the image fluctuation detecting circuit 4. The prediction arithmetic circuit 202 predicts the image fluctuation in the succeeding field by using the movement vector Sg3 determined by the movement vector calculating circuit 201, to thereby output the result of the predicting operation as the image fluctuation predicting vector Sg2. The movement vector integrating circuit 203 integrates the image fluctuation predicting vector Sg2 outputted from the prediction arithmetic circuit 202 on a field-by-field basis. Hereinafter, the output of the movement vector integrating circuit 203 will be referred to as the fluctuation predicting integral vector Sg4'. The integral vector correcting circuit 504 corrects error involved in the prediction value Sg4' outputted from the movement vector integrating circuit 203 on the basis of the outputs from the movement vector calculating circuit 201 and the prediction arithmetic circuit 202, to thereby determine the addresses for reading out the picture signals actually from the photoelectric conversion device 1. (Parenthetically, the image fluctuation predicting vector Sg2 obtained from the prediction arithmetic circuit 202 is determined by prediction in the preceding field and stored in the integral vector correcting circuit 504 to be utilized for correcting the output of the movement vector integrating circuit 203.)

Next, description will be turned to operations of the image fluctuation detecting apparatus according to the second embodiment of the invention.

Figure 7:
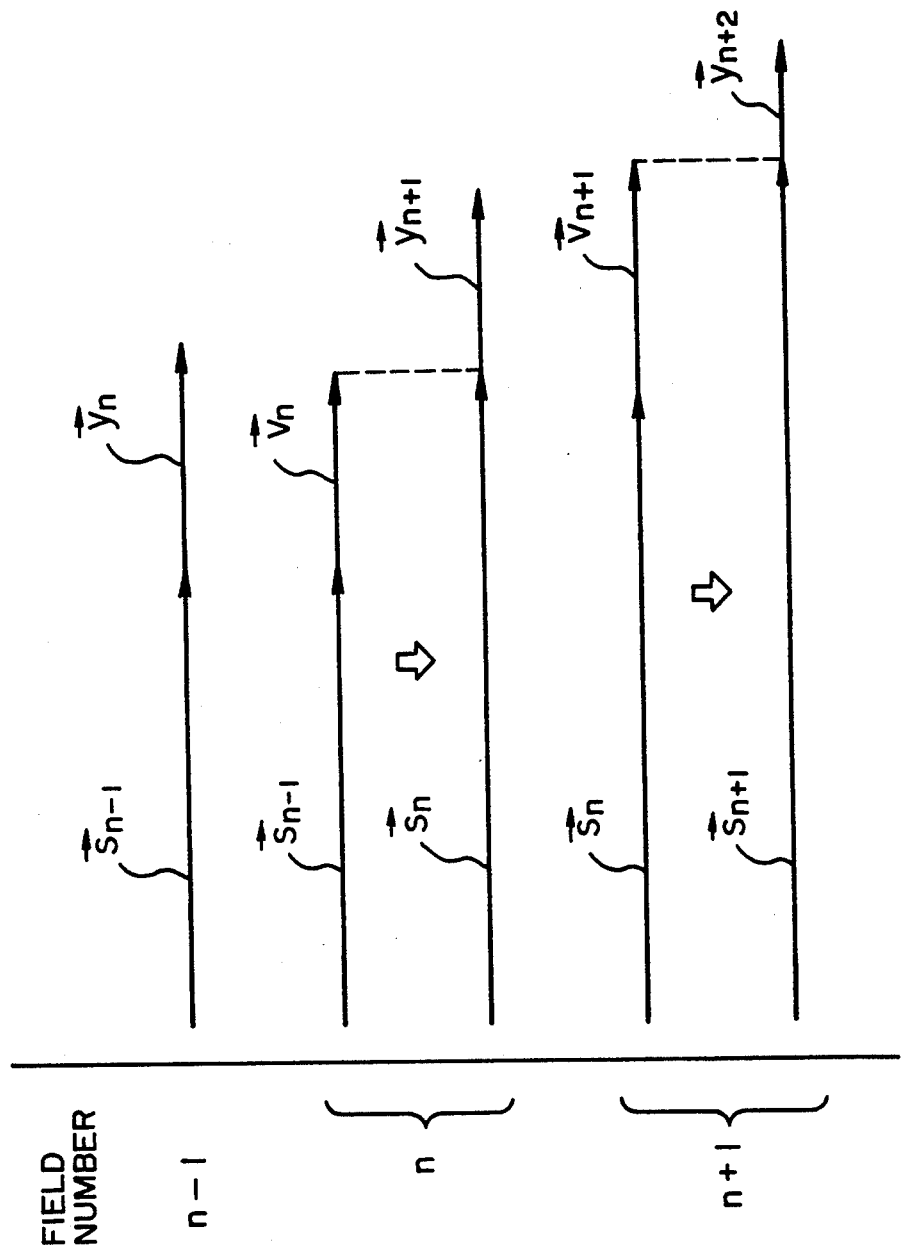
FIG. 7 is a diagram for illustrating operation of an integral vector correcting circuit of the image fluctuation correcting apparatus according to the second embodiment.

In the image fluctuation detecting circuit 4, correlation between the picture signals of a current field as outputted from the photoelectric conversion device 1 and the representative point signals of the preceding field picture signals which are stored in the representative point storing circuit 101 is determined by the correlation arithmetic circuit 102. On the basis of the result of this correlation, the image fluctuation is detected. It should however be noted that the image fluctuation information Sg1 thus obtained represents a difference between the image fluctuation which has been predicted by the image fluctuation predicting circuit 5 in the preceding field and the actual image fluctuation of the current field. Consequently, when the fluctuation predicted by the image fluctuation predicting circuit 5 is the same as the actual image movement, the amount of the image fluctuation determined by the image fluctuation detecting circuit 4 is zero. The image fluctuation information Sg1 detected by the image fluctuation detecting circuit 4 is added to (or subtracted from) the image fluctuation prediction vector Sg2 determined by the vector calculating circuit 201 in the preceding field, wherein the result of this addition (or subtraction) is supplied to the prediction arithmetic circuit 202 as the actual movement vector Sg3 for the current field relative to the preceding field. The prediction arithmetic circuit 202 then determines an image fluctuation predicted for a succeeding field on the basis of the data Sg3 inputted from the vector calculating circuit 201, wherein the predicted image fluctuation is supplied to the movement vector integrating circuit 203 as the image fluctuation predicting vector Sg2. The movement vector integrating circuit 203 calculates an integral value Sg4' of the image fluctuation predicting vector Sg2. However, the image fluctuation prediction vector Sg2 integrated by the circuit 203 is naturally considered to include some error involved by the prediction because the vector Sg2 is predicted by the prediction arithmetic circuit 202. Under the circumstances, correction is performed on the fluctuation predicting integral vector Sg4' on a field-by-field basis by making use of the actual movement vector Sg3 determined by the movement vector calculating circuit 201 for the current field and the image fluctuation predicting vector Sg2 predicted by the prediction arithmetic circuit 202 in the preceding field, to thereby realize the fluctuation correction more accurately. This will be explained in more detail by reference to FIG. 7. Referring to the figure, a reference symbol n represents the current field, a symbol $S_n$ represents an integral value of the movement vectors determined up to the current field, a vector $y_{n+1}$ represents the image fluctuation predicting vector Sg2 for the succeeding field, which vector Sg2 is predicted in the current field, and a vector $V_n$ represents the actual movement vector Sg3 of the current field relative to the preceding field. For simplification of description, the vectors are assumed to be one-dimensional vectors. According to the teaching of the invention implemented in the instant embodiment, in place of the image fluctuation predicting vector Sg2 used in the integrating operation in the preceding field (i.e., the predicted movement vector value $Y_n$ of the current field determined in the preceding field), the actual movement vector Sg3 (vector $V_n$ shown in FIG. 7) of the current field relative to the preceding field as determined by the movement vector calculating circuit 201 is employed in the integrating operation. Subsequently, the integral value of the image fluctuation determined up to the current field (i.e., vector $S_n$ = vector $S_{n-1}$ + vector $V_n$ shown in FIG. 7) is added with the image fluctuation predicting vector Sg2 determined by the prediction arithmetic circuit 202 in the current field (i.e., vector $Y_{n+1}$ shown in FIG. 7), for thereby determining the addresses for reading out the picture signals from the photoelectric conversion device 1. On the basis of the addresses thus determined, the photoelectric conversion device control circuit 6 controls the start address for reading out the photoelectric conversion device 1 to thereby change correspondingly the area from which the picture signals are to be read out. In this manner, the image fluctuation components ascribable to the shaking or swing of the image pickup apparatus can be corrected on the photoelectric conversion device 1 itself.

As will be apparent from the above description, in the case of the second embodiment of the invention according to which the movement vector predicting circuit 5 is additionally provided with the integral vector correcting circuit 504, the signal read operation from the photoelectric conversion device 1 can be performed with enhanced accuracy, while ensuring higher accuracy for the correction or compensation of the image fluctuation or movement.

It is also apparent that the functions of the individual circuits constituting the image fluctuation correcting apparatus according to the first embodiment can equally be realized by using a software technique.

In the above description, it has been assumed that the image fluctuation detecting circuit 4 is constituted by a circuit known heretofore. It should however be understood that the invention is not restricted to the use of such known image fluctuation detecting circuit 4.

Furthermore, although it has been described that detection of the image fluctuation and prediction thereof are performed on a field basis, the invention is not limited to this concept. Detection of the image fluctuation as well as the prediction thereof may also be performed on a frame-by-frame basis to substantially the same effect.

Embodiment 3

A third embodiment of the image fluctuation correcting apparatus implementing the first aspect of the invention differs from the first embodiment only in respect of the structure of the image fluctuation predicting circuit 5. In other words, except for the image fluctuation predicting circuit 5, the components of the third embodiment are the same as those of the first embodiment. Accordingly, these same components are denoted by like reference symbols as those used in fIG. 1 and repeated description thereof is omitted. Thus, the following description will be made with emphasis put on the circuit arrangement which differs from the first embodiment.

FIG. 8 is a block diagram showing in concrete form a circuit configuration of the image fluctuation predicting circuit 5 according to the third embodiment of the invention. The image fluctuation predicting circuit 5 according to the instant embodiment differs from that of the first embodiment in that a fractional error correcting circuit 604 is additionally provided. The fractional error correcting circuit 604 has inputs supplied with the outputs Sg1 and Sg4 of the image fluctuation detecting circuit 4 and the movement vector integrating circuit 203, respectively, wherein the output of the fractional error correcting circuit 604 is supplied to the movement vector calculating circuit 201.

The fractional error correcting circuit 604 is designed to correct fractional errors which are ascribable to the fact that the operation for reading the picture signals from the photoelectric conversion device 1 can be performed only on a line-by-line basis. The image fluctuation information Sg1' which has undergone the fractional error correction by the fractional error correcting circuit 604 is supplied to the movement vector calculating circuit 201. The structures and operations of the components disposed downstream of the movement vector calculating circuit in the image fluctuation predicting circuit 5 are the same as those of of the circuit components in the first embodiment, and thus repeated description thereof will be unnecessary.

Now, description will be turned to operations of the image fluctuation correcting apparatus according to the third embodiment of the invention.

Figure 9:
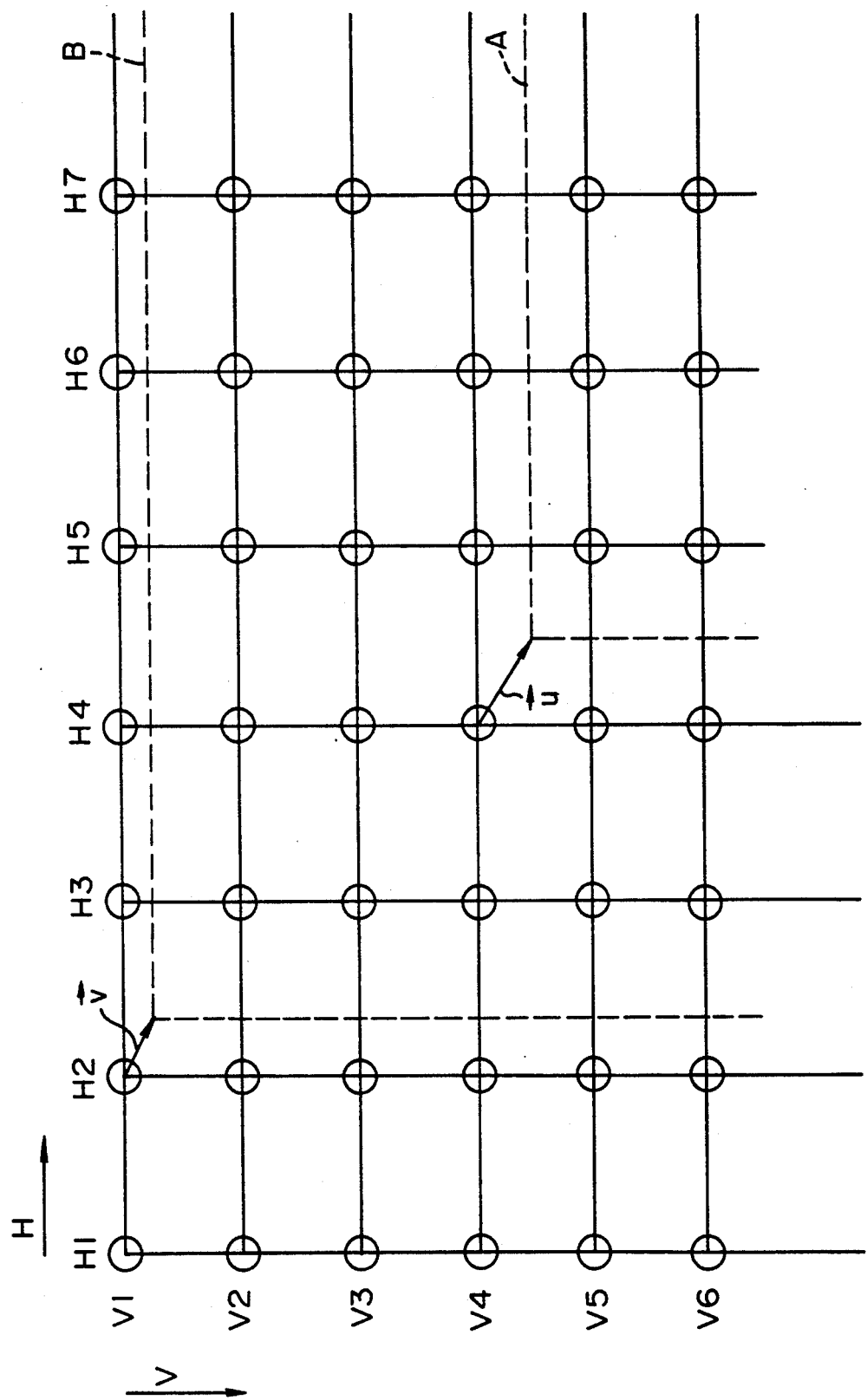
FIG. 9 is a view for illustrating operation of a fractional error correcting circuit of the image fluctuation correcting apparatus according to the third embodiment.

In the image fluctuation detecting circuit 4, correlation between the picture signals of a current field as outputted from the photoelectric conversion device 1 and the representative point signals of the preceding field picture signals which are stored in the representative point storing circuit 101 is determined by the correlation arithmetic circuit 102. On the basis of the result of this correlation, the image fluctuation is detected. It will be understood that the image fluctuation information Sg1 thus obtained represents a difference between the image fluctuation which has been predicted by the image fluctuation predicting circuit 5 in the preceding field and the actual image fluctuation of the current field. Consequently, when the fluctuation predicted by the image fluctuation predicting circuit 5 is the same as the actual image move, the amount of the image fluctuation determined by the image fluctuation detecting circuit 4 is zero. With regard to the accuracy of the image fluctuation information Sg1 detected by the image fluctuation detecting circuit 4, the image fluctuation prediction vector Sg2 produced by the prediction arithmetic circuit 202 and the fluctuation predicting integral vector Sg4 outputted from the movement vector integrating circuit 203, it is possible to realize accuracy on the order of one pixel or less. However, since the picture signals are read out from the photoelectric conversion device 1 on the line-by-line basis in actuality, there arises a problem when the fluctuation predicting integral vector Sg4 determined by the image fluctuation predicting circuit 5 assumes a value including a fraction (i.e., decimal part) rather than an integer value. More specifically, when correction finer than one pixel is to be taken into consideration, the picture signal read operation performed with the fraction being rounded off will naturally involve error due to the rounding-off of the fraction in the results of the arithmetic operations such as determination of correlation between the picture signals as read out. More specifically, referring to fIG. 9, the error of concern will be explained in more detail. In this figure, circles depicted at intersections of a lattice shown in solid lines represent schematically light receiving elements, respectively, wherein positions of the individual light receiving elements are designated by the coordinates v1, v2, v3 and so forth from the top in the vertical direction and h1, h2, h3 and so forth from the left-hand side in the horizontal direction, as viewed in FIG. 9. Frames A and B shown in broken line represent cut-out frames including fractions, respectively, which are determined by the movement vector predicting circuit 5, wherein the cut-out frame A is for the current field with the cut-out frame B being for the succeeding field. When the frame A is designed by the image fluctuation predicting circuit 5, the picture signal read-out operation is then started from the light receiving element located at the coordinates (h4, v4) because of impossibility of reading the picture signal from the space between the light receiving elements. At that time, there occurs a difference indicated by a vector u in fIG. 9 between the read-out frame on the photoelectric conversion device 1 and a frame for correction indicated by the fluctuation predicting integral vector Sg4. Subsequently, in the succeeding field, the picture signal read-out operation is started from the light receiving elements located at the coordinates (h2, v1) on the photoelectric conversion device 1 for cutting out the frame for correction represented by the frame B. At this time, there makes appearance a difference indicated by a vector v in FIG. 9 between the read-out frame on the photoelectric conversion device 1 and the fluctuation predicting integral vector Sg4. Since the fluctuation detecting circuit 4 performs the detection of image fluctuation between the two fields mentioned above by using the picture signals read out from the photoelectric conversion device 1, no consideration is paid to the differences between the frame for correction and the read-out frame, i.e., the vectors u and v. As a consequence, the difference between these two vectors is erroneously detected as a fluctuation between the two fields represented by the frames A and B. With a view to invalidating the erroneous detection, the fractional error correcting circuit 604 stores the fluctuation predicting integral vectors Sg4 used for reading out the picture signals from the photoelectric conversion device 1 in the fields A and B, respectively, and determines the above-mentioned error to thereby cancel out the error corresponding to the fraction from the image fluctuation data Sg1 obtained from the image fluctuation detecting circuit 4. Through this processing, prediction of the fluctuation in the succeeding field can be performed with increased accuracy by the image fluctuation predicting circuit 5. The image fluctuation information Sg1' detected by the image fluctuation detecting circuit 4 and corrected by the fractional error correcting circuit 604 is added to (or subtracted from) the predicted movement vector value predicted in the preceding field by the movement vector calculating circuit 201, the output of which is supplied to the prediction arithmetic circuit 202 as the actual movement vector Sg3 of the current field relative to the preceding field. The prediction arithmetic circuit 202 determines the image fluctuation predicted for the succeeding field on the basis of the information supplied from the movement vector calculating circuit 201, and the predicted image fluctuation thus determined is then supplied to the movement vector integrating circuit 203 which computes an integral value (i.e., fluctuation predicting integral vector Sg4) from the image fluctuation predicting vector Sg2. The image fluctuation predicting integral vector signal Sg4 is supplied to the photoelectric conversion device control circuit 6 for controlling the start address for reading out the picture signal from the photoelectric conversion device 1 to thereby change the area from which the picture signals are to be read out. In this way, the image fluctuation components ascribable to the swing, shaking or the like movements of the image pickup apparatus can be corrected on the very same photoelectric conversion element 1.

At this juncture, it should be added that the integral vector correcting circuit 504 in the apparatus according to the third embodiment may be disposed in succession to the movement vector integrating circuit 203 of the image fluctuation predicting circuit 203 for correcting the output of the movement vector integrating circuit 5 by using the outputs Sg3 and Sg2 of the movement vector calculating circuit 201 and the prediction arithmetic circuit 202, respectively, wherein the output of the integral vector correcting circuit 504 may be inputted to the fractional error correcting circuit 604. With this arrangement, similar effects to those of the second embodiment of the invention can be realized.

As will be understood from the above description, it is possible according to the teachings of the invention implemented in the third embodiment to predict with improved accuracy the image fluctuation in a succeeding field by the image fluctuation predicting circuit 5 owing to the correction performed by the fractional error correcting circuit 604 on the error brought about by rounding off the fraction included in the image fluctuation information Sg1 detected by the image movement vector detecting circuit 4 between two successive fields.

It is apparent that the functions of the individual circuits constituting the image fluctuation correcting apparatus according to the third embodiment can equally be realized by using a software technique.

In the above description of the third embodiment of the invention, it has been assumed that the image fluctuation detecting circuit 4 is constituted by a circuit known heretofore. It should however be understood that the invention is not restricted to the use of such known image fluctuation detecting circuit 4.

Although it has been described that detection of the image fluctuation and prediction thereof are performed on a field basis, the invention is not limited to this concept. Detection of the image fluctuation as well as the prediction thereof may also be performed on a frame-by-frame basis to substantially the same effect.

Embodiment 4

Next, description will be made of an embodiment of the image fluctuation correcting apparatus which implements a second aspect of the invention. This embodiment will hereinafter be referred to as the fourth embodiment.

Figure 10:
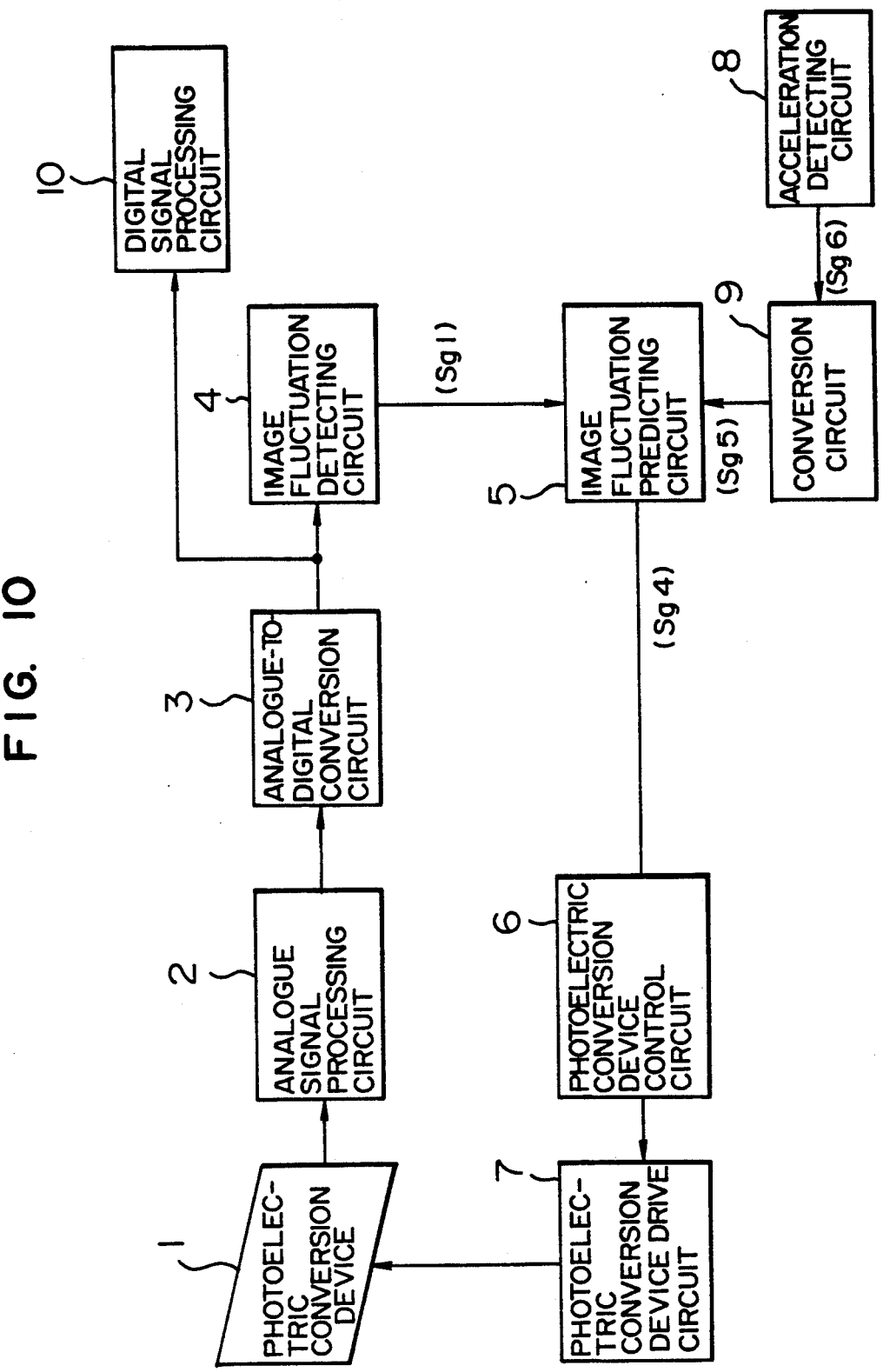
FIG. 10 is a block diagram showing a structure of an image fluctuation correcting apparatus according to a fourth embodiment implementing a second aspect of the present invention.

Referring to FIG. 10 showing in a block diagram an image fluctuation correcting apparatus according to the fourth embodiment of the invention, a reference numeral 1 denotes a photoelectric conversion device such as exemplified by a CCD or the like which is adapted to convert a picture picked up through an optical system of an image pickup apparatus (also known as the imaging device) into electric signals (hereinafter referred to as the picture signals). The picture signals outputted from the photoelectric conversion device 1 are supplied to an analogue signal processing circuit 2 to undergo signal processings such as an automatic gain correction (AGC), a gamma correction and others. The analogue picture signals outputted from the an analogue signal processing circuit 2 are then supplied to an analogue-to-digital conversion circuit 3 to be thereby converted into corresponding digital signals, being then inputted to an image fluctuation detecting circuit 4 which serves to detect an inter-field image fluctuation (i.e., motion of image between successive fields) from the digital picture signals, which fluctuation may be brought about by swing, shaking, vibration or the like movements of the image pickup apparatus. The fluctuation detection signal outputted from the image fluctuation detecting circuit 4 is inputted to an image fluctuation predicting circuit 5 as an image fluctuation information signal Sg1. An acceleration detecting circuit 8 is provided for detecting acceleration of movement of the image pickup apparatus and may be constituted, for example, by an acceleration sensor implemented by using a piezoelectric element. A conversion circuit 9 converts the acceleration signal detected by the acceleration detecting circuit 8 into acceleration information by integrating the acceleration signal over a predetermined period and further serves for gain adjustment of the acceleration information resulting from the conversion. The image fluctuation predicting circuit 5 predicts a fluctuation of an image in a succeeding field on the basis of the image fluctuation information signal Sg1 supplied from the image fluctuation detecting circuit 4 and the converted or conditioned acceleration information obtained from the conversion circuit 9. An integral value outputted from the image fluctuation predicting circuit 5 and representing a fluctuation as predicted is supplied to a control circuit 6 for controlling the photoelectric conversion device 1. The photoelectric conversion device control circuit 6 is designed to control addresses for reading out the picture signals from the photoelectric conversion device I on the basis of the predicted integral value of the image fluctuation obtained from the image fluctuation predicting circuit 5. At this juncture, it should be noted that in the case of a solid state image pickup apparatus known heretofore, the start address for reading a picture signal is determined fixedly. In contrast, in the case of the instant embodiment of the invention, the start address for reading out a picture signal is made variable. Besides, the picture signals are read out from a partial picture area of the image pickup apparatus in contrast to the conventional imaging device in which the picture signals are read out from the whole area of the device, wherein the area from which the picture signals are to be read out is made variable by controlling the read start address by means of a photoelectric conversion device control circuit 6. In this manner, the image fluctuation correction which has heretofore been realized by changing the start address for reading the picture signal from a field memory can be realized by controlling straightforwardly the start address for reading out the picture signal from the solid state image pickup apparatus itself according to the teaching of the invention. A photoelectric conversion device drive circuit 7 serves for driving the photoelectric conversion device 1. Finally, a digital signal processing circuit 10 is designed to perform various digital signal processings on the picture signals outputted from the analogue-to-digital conversion circuit 3 such as luminance signal separation, horizontal/vertical aperture correction, autoknee correction, chrominance signal separation, white balance correction, false color elimination, electronic zoom processing and others.

Parenthetically, the image fluctuation detecting circuit 4 used in the fourth embodiment of the invention can be implemented in a similar structure as that of the first embodiment shown in FIG. 2 and serves for virtually the same functions as those of the latter. Accordingly, repeated description thereof is omitted. Besides, individual component circuits constituting the image fluctuation detecting circuit are the same as those shown in FIG. 2 and denoted by using the same reference symbols in FIG. 10 as well.

Figure 11:
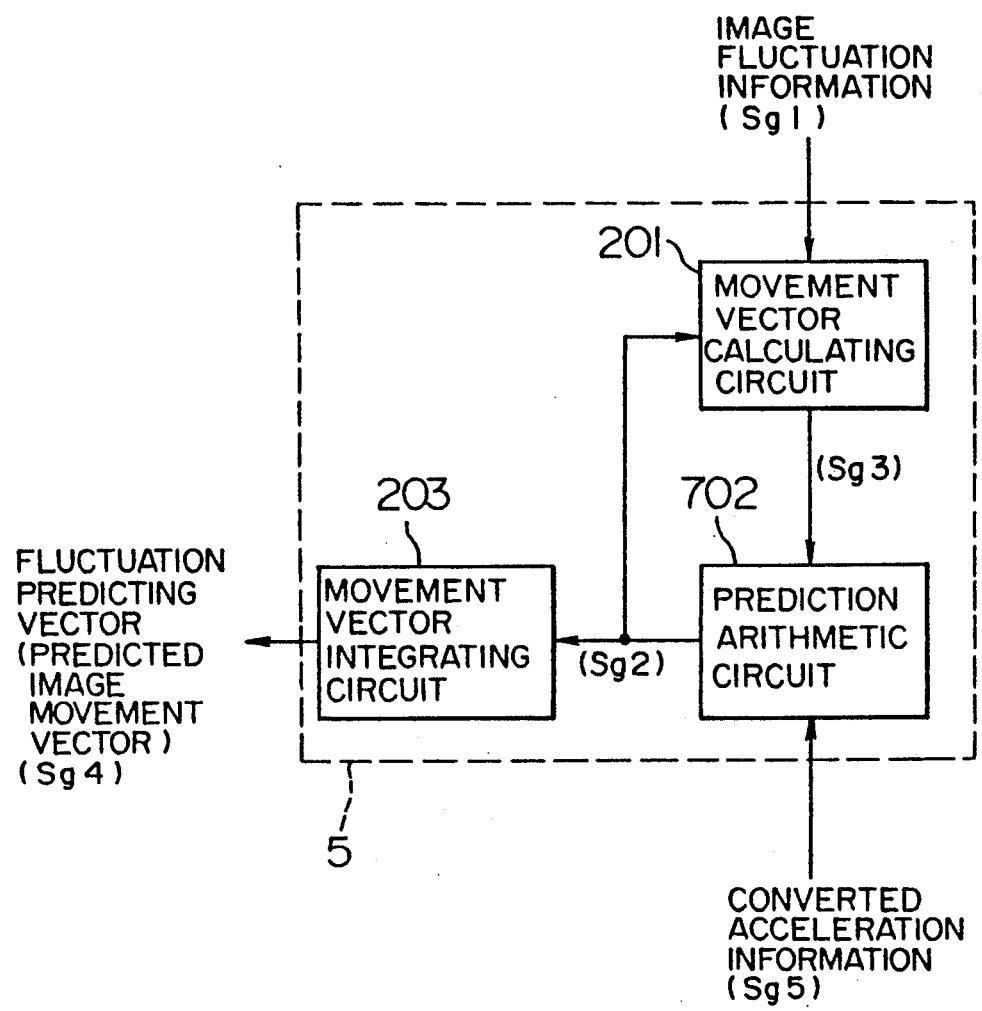
FIG. 11 is a block diagram showing in concrete an exemplary structure of an image fluctuation predicting circuit shown in FIG. 10.

FIG. 11 is a block diagram showing in concrete form an exemplary structure of the image fluctuation predicting circuit 5 shown in FIG. 10. Referring to FIG. 11, a prediction arithmetic circuit 702 serves to predict a movement vector of a succeeding field (i.e., a field succeeding the current field) by calculation on the basis of the movement vector determined up to the current field and the acceleration information which is obtained from the conversion circuit 9 shown in FIG. 10 and which has undergone the gain adjustment. Hereinafter, the movement vector of the succeeding field will be referred to as the image fluctuation predicting vector Sg2. The movement vector used currently is obtained by adding to (or subtracting from) the image fluctuation prediction vector Sg2 determined by the prediction arithmetic circuit 702 for the field immediately preceding the current field the image fluctuation information Sg1 determined by the fluctuation detecting circuit 4 in each field. Thus, it can be said that the movement vector used herein represents the actual movement vector Sg3 for each field. The actual movement vector Sg3 for each field is calculated by the vector calculating circuit 201. More specifically, the vector calculating circuit 201 stores the image fluctuation prediction vector Sg2 outputted from the prediction arithmetic circuit 702 on a field-by-field basis and determines the actual interfield movement vector Sg3 by using the image fluctuation prediction vector Sg2 and the image fluctuation information Sg1 outputted from the image fluctuation detecting circuit 4. A movement vector integrating circuit 203 integrates the image fluctuation prediction vector Sg2 outputted from the prediction arithmetic circuit 702 on a field-by-field basis. Hereinafter, the output of the movement vector integrating circuit 203 will be referred to as the fluctuation predicting integral vector Sg4.

Now, description will be turned to operations of the image fluctuation detecting apparatus of the structure described above.

In the image fluctuation detecting circuit 4, correlation between the picture signals of a current field as outputted from the photoelectric conversion device 1 and the representative point signals of the preceding field picture signals which are stored in the representative point storing circuit 101 is determined by the correlation arithmetic circuit 102. On the basis of the result of this correlation, the image fluctuation is detected. It should be noted that the image fluctuation information Sg1 thus obtained represents a difference between the image fluctuation which has been predicted by the image fluctuation predicting Circuit 5 in the preceding field and the actual image fluctuation of the current field. Consequently, when the fluctuation predicted by the image fluctuation predicting circuit 5 is the same as the actual image movement, the image fluctuation determined by the image fluctuation detecting circuit 4 is zero. The image fluctuation data Sg1 detected by the image fluctuation detecting circuit 4 is added to (or subtracted from) the image fluctuation prediction vector Sg2 determined by the vector calculating circuit 201 in the preceding field, wherein the result of this addition (or subtraction) is supplied to the prediction arithmetic circuit 702 as the actual movement vector Sg3 of the current field relative to the preceding field. The prediction arithmetic circuit 702 then determines an image fluctuation predicted for a succeeding field on the basis of the data Sg3 inputted from the vector calculating circuit 201 and the acceleration information concerning movement of the image pickup apparatus outputted from the conversion circuit 9 and having its gain adjusted, wherein the predicted image fluctuation is supplied to the movement vector integrating circuit 203 as the image fluctuation predicting vector Sg2.

In this conjunction, the prediction arithmetic circuit 702 is implemented in such a structure as to determine as the image fluctuation prediction vector Sg2 a sum of the actual movement vector Sg3 of the current field relative to the preceding field as determined by the movement vector calculating circuit 201 and a value obtained by integrating in the conversion circuit 9 the acceleration information outputted from the acceleration detecting circuit 8 over a period between a time point when the picture signals of the current field were read out from the photoelectric conversion device 1 and a time point at which the picture signals of the succeeding field are read out, the signal resulting from the integration being adjusted in respect to gain (i.e., the value representing a change in speed of movement of the image pickup apparatus within one field).

By using the image fluctuation prediction vector Sg2 described above, the movement vector integrating circuit 203 determines an integral value Sg4 of the image fluctuation prediction vectors Sg2 obtained on a field-by-field basis. The fluctuation predicting integral vector Sg4 thus determined is supplied to the photoelectric conversion device control circuit 6, which then controls the start address for reading the picture signals on the photoelectric conversion device 1 on the basis of the predicting integral vector Sg4 to thereby change correspondingly the area of the photoelectric conversion device 1 from which the picture signals are to be read out. In this way, the image fluctuation component ascribable to the swing of the image pickup apparatus can be corrected on the photoelectric conversion device 1 itself.

As will be appreciated from the above description, it is possible to correct the image fluctuation without using the field memory circuit by changing the start address for reading out the signals on the photoelectric conversion device 1 in accordance with the predicted integral vector Sg4 for a succeeding field, which vector is predicted by the movement vector predicting circuit 5.

It is also apparent that the functions of the individual circuits constituting the image fluctuation correcting apparatus according to the fourth embodiment can equally be realized by resorting to a software technique.

In case a photoelectric conversion device having a number of pixels conforming to the NTSC standards are employed in the instant embodiment to thereby obtain the final picture signals which are compatible with the NTSC system, the digital signal processing circuit has to be so implemented as to realize the zoom function through electronic processing to thereby perform zoom processing on the picture signals outputted from the solid state image pickup apparatus so as to meet the standards of the NTSC system, because the image fluctuation correction is performed not by reading the picture signals from the whole picture area but by reading from a portion of the picture area of the solid state image pickup apparatus according to the instant embodiment of the invention. Further, it is conceivable to use the photoelectric conversion device having a number of pixels conforming to the PAL standards. In this case, the digital signal processing circuit has to be imparted with the electronic zoom function in order that the picture signals available ultimately can be utilized as the picture signals for the PAL system. Further, in view of the fact that the pixel number of the PAL system is greater than that of the NTSC, it is preferred to use the solid state image pickup apparatus having a greater number of pixels than those of the PAL system and the NTSC system so that the finally obtained picture signals can be made compatible with the PAL standards and the NTSC standard without the need for the electronic zoom processing.

Although no description has been made concerning the accuracy of the image fluctuation information Sg1 detected by the image fluctuation detecting circuit 4, the image fluctuation prediction vector Sg2 predicted by the image fluctuation predicting circuit 5 and the fluctuation predicting integral vector Sg4 obtained by the movement vector integrating circuit 203, it should be understood that accuracy on the order of one pixel or less can be realized by resorting to the conventional technique. To this end, the digital signal processing circuit 10 may be so implemented as to have a picture signal interpolating function so that the picture signals corrected in respect to the fluctuation with an accuracy equivalent to one pixel or less through the interpolating processing can be generated on the basis of the fluctuation predicting integral vector Sg4 mentioned above.

In the above description of the fourth embodiment of the invention, it has been assumed that the image fluctuation detecting circuit 4 is constituted by a circuit known heretofore. It should however be understood that the invention is not restricted to the use of such known image fluctuation detecting circuit 4.

Although it has been described that detection of the image fluctuation and prediction thereof are performed on a field basis, the invention is not limited to this concept. Detection of the image fluctuation as well as the prediction thereof may also be performed on a frame-by-frame basis to substantially the same effect.

Embodiment 5

A fifth embodiment of the image fluctuation correcting apparatus implementing the second aspect of the present invention will be described.

The fifth embodiment of the image fluctuation correcting apparatus differs from the fourth embodiment only in respect to the image fluctuation predicting circuit 5 shown in FIG. 10. In other words, except for the image fluctuation predicting circuit 5, the components of the fifth embodiment are the same as those of the fourth embodiment. Accordingly, these same components are denoted by like reference symbols as those used in FIG. 10 and repeated description is omitted. Thus, the following description will be made mainly of the circuit arrangement which differs from the fourth embodiment.

Figure 12:
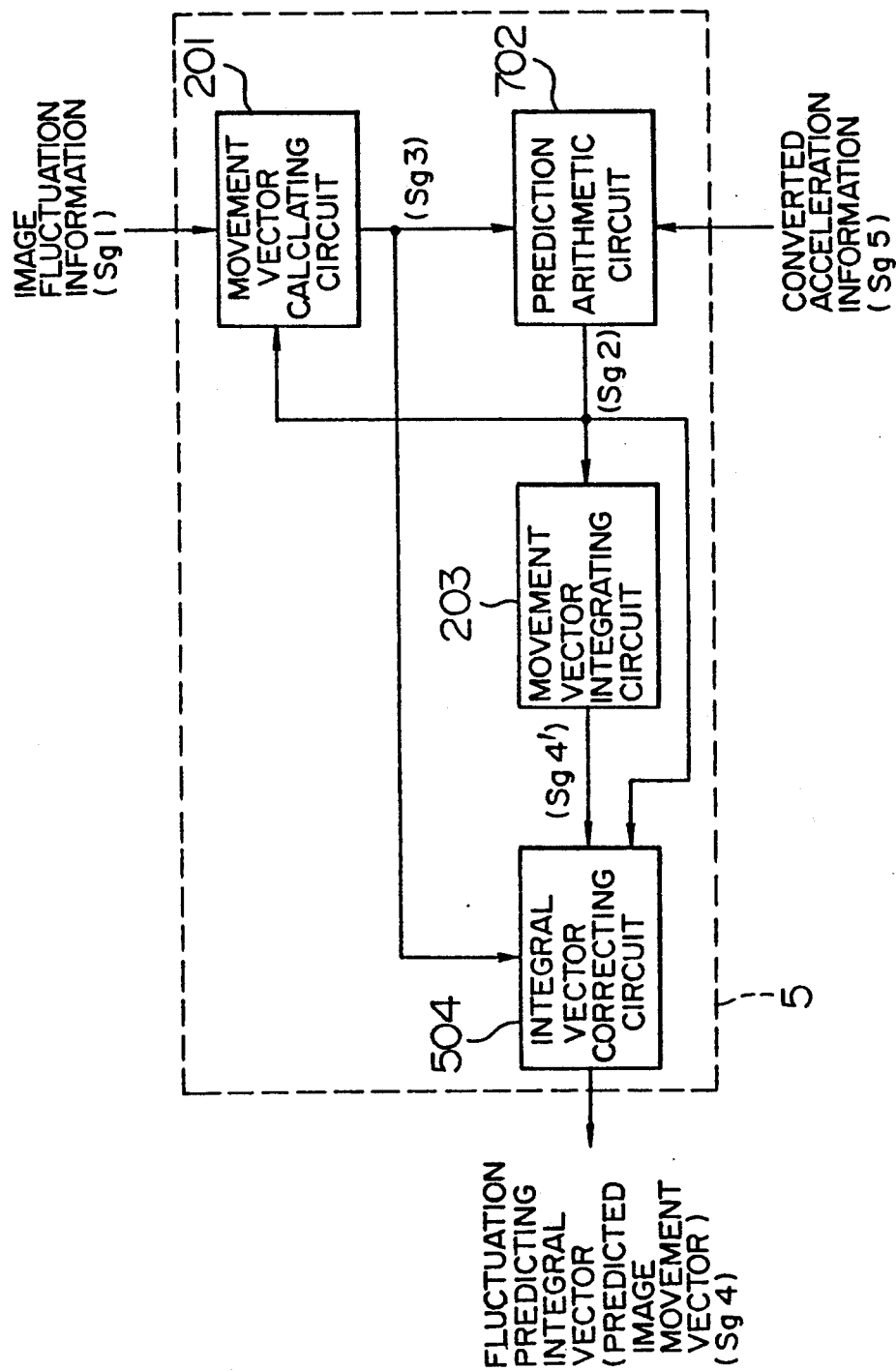
FIG. 12 is a block diagram showing a circuit configuration of the image fluctuation predicting circuit of the image fluctuation correcting apparatus according to a fifth embodiment implementing the second aspect of the present invention.

FIG. 12 is a block diagram showing in concrete form a circuit configuration of the image fluctuation predicting circuit 5 of the image fluctuation correcting apparatus according to the fifth embodiment. The image fluctuation predicting circuit 5 according to the instant embodiment differs from that of the fourth embodiment in that an integral vector correcting circuit 504 is additionally provided. The integral vector correcting circuit 504 has inputs supplied with the outputs Sg3, Sg4' and Sg2 of the movement vector calculating circuit 201, the movement vector integrating circuit 203 and the prediction arithmetic circuit 702, respectively. In FIG. 12, the prediction arithmetic circuit 702 serves to predict a movement vector of a succeeding field on the basis of the movement vector determined for the current field by the movement vector calculating circuit 201 and the acceleration information outputted from the conversion circuit 9. (Hereinafter, the movement vector of the succeeding field will be referred to as the image fluctuation predicting vector Sg2.) The movement vector used herein is obtained by adding to (or subtracting from) the image fluctuation prediction vector Sg2 determined by the prediction arithmetic circuit 702 for the field immediately preceding the current field the image fluctuation information Sg1 determined by the fluctuation detecting circuit 4 on a field-by-field basis. Thus, it can be said that the movement vector of concern represents the actual movement vector Sg3 for each field. The actual movement vector Sg3 for each field is calculated by the vector calculating circuit 201. More specifically, the vector calculating circuit 201 stores the image fluctuation prediction vector Sg2 outputted from the prediction arithmetic circuit 702 on a field-by-field basis and determines the actual inter-field movement vector Sg3 by using the image fluctuation predicting vector Sg2 and the image fluctuation information Sg1 outputted from the image fluctuation detecting circuit 4. The prediction arithmetic circuit 702 predicts the image fluctuation in the succeeding field by using the movement vector determined by the movement vector calculating circuit 201, to thereby output the result of the prediction as the image fluctuation predicting vector Sg2. The movement vector integrating circuit 203 integrates the image fluctuation predicting vector Sg2 outputted from the prediction arithmetic circuit 702 on a field-by-field basis. (Hereinafter, the output of the movement vector integrating circuit 203 will be referred to as the fluctuation predicting integral vector Sg4'.) The integral vector correcting circuit 504 corrects error involved in the prediction value Sg4' outputted from the movement vector integrating circuit 203 on the basis of the outputs from the movement vector calculating circuit 201 and the prediction arithmetic circuit 702. (Parenthetically, the image fluctuation predicting vector Sg2 obtained from the prediction arithmetic circuit 202 is determined by prediction in the preceding field and stored in the integral vector correcting circuit 504 to be utilized for correcting the output of the movement vector integrating circuit 203.)

Next, description will be turned to operations of the image fluctuation detecting apparatus according to the instant embodiment.

In the image fluctuation detecting circuit 4, correlation between the picture signals of a current field as outputted from the photoelectric conversion device 1 and the representative point signals of the preceding field picture signals which are stored in the representative point storing circuit 101 is determined by the correlation arithmetic circuit 102. On the basis of the result of this correlation, the image fluctuation is detected. It should be noted that the image fluctuation information Sg1 thus obtained represents a difference between the image fluctuation which has been predicted for the current field by the image fluctuation predicting circuit 5 in the preceding field and the actual image fluctuation of the current field. Consequently, when the fluctuation predicted by the image fluctuation predicting circuit 5 is the same as the actual image movement, fluctuation of the image determined by the image fluctuation detecting circuit 4 is zero. The image fluctuation information Sg1 detected by the image fluctuation detecting circuit 4 is added to (or subtracted from) the image fluctuation prediction vector Sg2 determined by the vector calculating circuit 201 in the preceding field, wherein the result of this addition (or subtraction) is supplied to the prediction arithmetic circuit 702 as the actual movement vector Sg3 of the current field relative to the preceding field. The prediction arithmetic circuit 702 then determines an image fluctuation predicted for a succeeding field on the basis of the information Sg3 inputted from the vector calculating circuit 201 and the acceleration information outputted from the conversion circuit 9, wherein the predicted image fluctuation is supplied to the movement vector integrating circuit 203 as the image fluctuation predicting vector Sg2. The movement vector integrating circuit 203 calculates an integral value Sg4' of the image fluctuation prediction vector Sg2. However, the image fluctuation prediction vector Sg2 integrated by the circuit 203 is naturally considered to include some error involved by the prediction because the vector Sg2 is predicted by the prediction arithmetic circuit 702. Under the circumstances, correction is performed on the fluctuation predicting integral vector Sg4' on a field-by-field basis by making use of the actual movement vector Sg3 determined by the movement vector calculating circuit 201 for the current field, to thereby realize the fluctuation correction more accurately. This correction of the predicted fluctuation integral vector Sg4' is performed by an integral vector correcting circuit 504 which is of a same structure and serves for the same function as the integral vector correcting circuit 504 used in the apparatus according to the second embodiment of the invention described hereinbefore. Accordingly, repeated description of this integral vector correcting circuit 504 is omitted. On the basis of the predicted fluctuation integral vector Sg4 thus corrected by the integral vector correcting circuit 504, the photoelectric conversion device control circuit 6 controls the start address for reading out the photoelectric conversion device 1 to thereby change correspondingly the area from which the picture signals are to be read out. In this manner, the image fluctuation components ascribable to the shaking or swing of the image pickup apparatus can be corrected on the photoelectric conversion device 1 itself.

As will be apparent from the above description, in the case of the fifth embodiment of the invention according to which the movement vector predicting circuit 5 is additionally provided with the integral vector correcting circuit 504, the read operation of the picture signals from the photoelectric conversion device 1 can be performed with enhanced accuracy, while ensuring higher accuracy for the correction of the image movement.

It is apparent that the functions of the individual circuits constituting the image fluctuation correcting apparatus according to the fourth embodiment except for the acceleration detecting circuit can equally be realized by using a software technique.

In the above description, it has been assumed that the image fluctuation detecting circuit 4 is constituted by a circuit known heretofore. It should however be understood that the invention is not restricted to the use of such known image fluctuation detecting circuit 4.

furthermore, although it has been described that detection of the image fluctuation and prediction thereof are performed on a field basis, the invention is not limited to this concept. Detection of the image fluctuation as well as the prediction thereof may also be performed on a frame-by-frame basis to substantially the same effect.

Embodiment 6

A sixth embodiment of the image fluctuation correcting apparatus which implements the second aspect of the invention differs from the fourth embodiment only in respect to the structure of the image fluctuation predicting circuit 5 shown in FIG. 10. In other words, except for the image fluctuation predicting circuit 5, the components of the sixth embodiment are the same as those of the fourth embodiment. Accordingly, these same components are denoted by like reference symbols as those used in FIG. 10 and repeated description thereof is omitted. Thus, the following description will be made mainly of the circuit arrangement which differs from the fourth embodiment.

Figure 13:
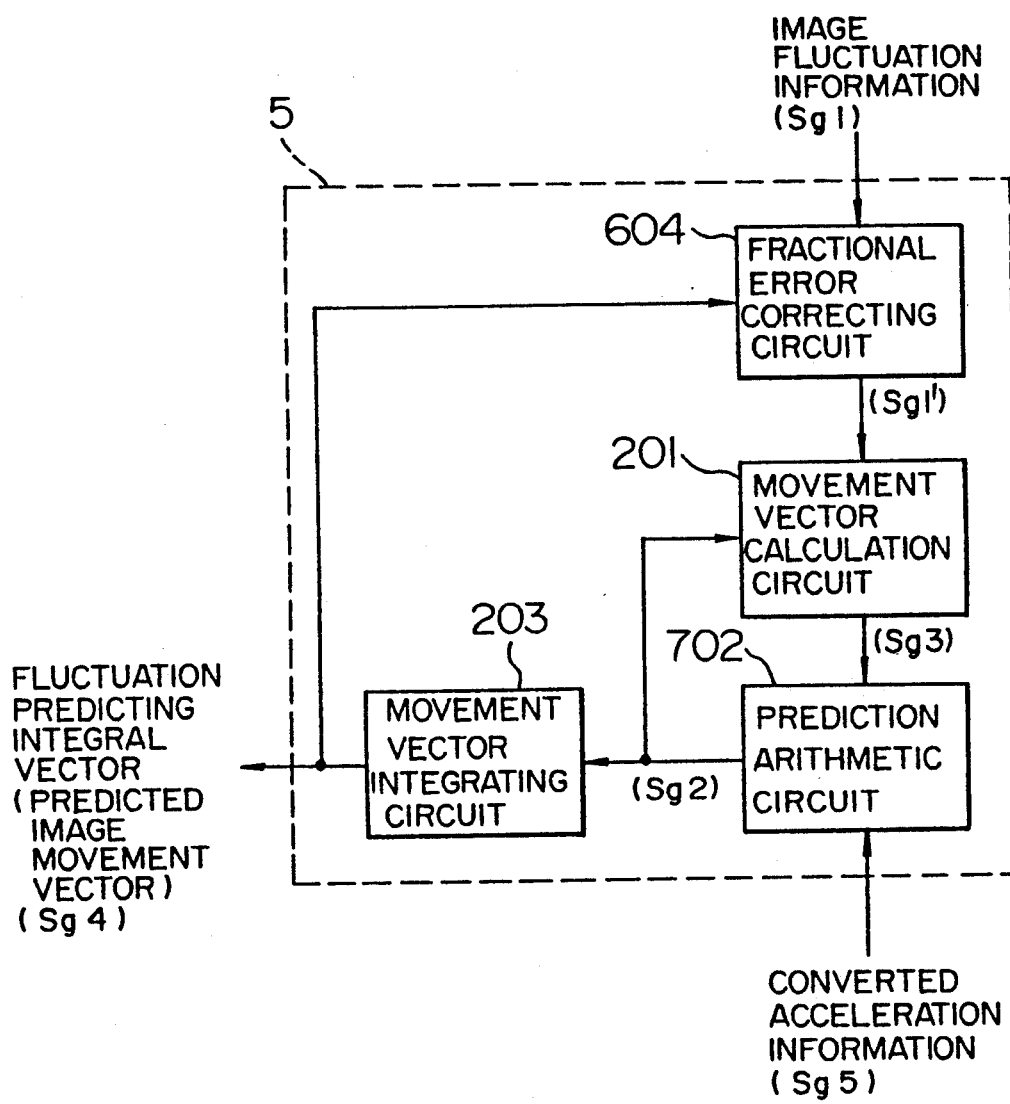
FIG. 13 is a block diagram showing a circuit configuration of an image fluctuation predicting circuit of the image fluctuation correcting apparatus according to a sixth embodiment implementing the second aspect of the invention.

FIG. 13 is a block diagram showing in concrete form a circuit configuration of the image fluctuation predicting circuit 5 according to the fifth embodiment of the invention. The image fluctuation predicting circuit 5 according to the instant embodiment differs from that of the fourth embodiment in that a fractional error correcting circuit 604 is additionally provided. The fractional error correcting circuit 604 has inputs supplied with the outputs Sg1 and Sg4 of the image fluctuation detecting circuit 4 and the movement vector integrating circuit 203, respectively, wherein the output of the fractional error correcting circuit 604 is supplied to the movement vector calculating circuit 201.

The fractional error correcting circuit 604 is designed to correct fractional errors which are ascribable to the fact that the operation for reading the picture signals from the photoelectric conversion device 1 can be performed only on a line-by-line basis. The image fluctuation information Sg1' which has undergone the fractional error correction by the fractional error correcting circuit 604 is supplied to the movement vector calculating circuit 201. The structures and operations of the components disposed downstream of the movement vector calculating circuit in the image fluctuation predicting circuit 5 are the same as those of of the circuit components in the third embodiment, and thus repeated description thereof in detail will be unnecessary.

Now, description will be turned to operations of the image fluctuation detecting apparatus according to the sixth embodiment of the invention.

In the image fluctuation detecting circuit 4, correlation between the picture signals of a current field as read out from the photoelectric conversion device 1 and the representative point signals of the preceding field picture signals which are stored in the representative point storing circuit 101 is determined by the correlation arithmetic circuit 102. On the basis of the result of this correlation, the image fluctuation is detected. As described hereinbefore, the image fluctuation information Sg1 thus obtained represents a difference between the image fluctuation which has been predicted for the current field by the image fluctuation predicting circuit 5 in the preceding field and the actual image fluctuation in the current field. Thus, when the fluctuation predicted by the image fluctuation predicting circuit 5 is the same as the actual image movement, fluctuation of the image as determined by the image fluctuation detecting circuit 4 is zero. With regard to the accuracy of the image fluctuation information Sg1 detected by the image fluctuation detecting circuit 4, the image fluctuation prediction vector Sg2 produced by the prediction arithmetic circuit 702 and the fluctuation predicting integral vector Sg4 outputted from the movement vector integrating circuit 203, it is possible to realize accuracy on the order of one pixel or less. However, since the picture signals are read out from the photoelectric conversion device 1 on a line-by-line basis in actuality, there arises a problem when the fluctuation predicting integral vector Sg4 determined by the image fluctuation predicting circuit 5 assumes a value including a fraction (i.e., decimal part) rather than an integer value. More specifically, when correction finer than one pixel is to be taken into consideration, the picture signal read operation performed with the fraction being rounded off will naturally involve error due to the rounding-off of the fraction. (Since this error has been elucidated hereinbefore in conjunction with the third embodiment, repeated description will be unnecessary.) The fractional error correcting circuit 604 stores the fluctuation predicting integral vectors Sg4 used for reading out the picture signals from the photoelectric conversion device 1 in the fields A and B, respectively, and determines the above-mentioned error to thereby cancel out the error corresponding to the fraction from the image fluctuation data Sg1 obtained from the image fluctuation detecting circuit 4. Through this processing, prediction of the fluctuation in the succeeding field can be performed with increased accuracy by the image fluctuation predicting circuit 5. The image fluctuation information Sg1' detected by the image fluctuation detecting circuit 4 and corrected by the fractional error correcting circuit 604 is added to (or subtracted from) the predicted movement vector value predicted in the preceding field by the movement vector calculating circuit 201, the output of which is supplied to the prediction arithmetic circuit 702 as the actual movement vector Sg3 of the current field relative to the preceding field. The prediction arithmetic circuit 702 determines the image fluctuation predicted for the succeeding field on the basis of the information supplied from the movement vector calculating circuit 201 and the acceleration information supplied from the conversion circuit 9, wherein the predicted image fluctuation thus determined is then supplied to the movement vector integrating circuit 203 which computes an integral value (i.e., fluctuation predicting integral vector Sg4) on the basis of the image fluctuation predicting vector Sg2. The image fluctuation predicting integral vector signal Sg4 is supplied to the photoelectric conversion device control circuit 6 for controlling the start address for reading out the picture signal from the photoelectric conversion device 1 to thereby change the area from which the picture signals are to be read out. In this way, the image fluctuation components ascribable to the swing, shaking or the like movements of the image pickup apparatus can be corrected on the photoelectric conversion element 1.

At this juncture, it should be added that the integral vector correcting circuit 504 in the apparatus according to the fifth embodiment may be provided in succession to the movement vector integrating circuit 203 of the image fluctuation predicting circuit 203 for correcting the output of the movement vector integrating circuit 203 by using the outputs of the movement vector calculating circuit 201 and the prediction arithmetic circuit 702, wherein the output of the integral vector correcting circuit 604 may be inputted to the fractional error correcting circuit 604. With this arrangement, similar effects to those of the fifth embodiment of the invention can be realized.

As will be understood from the above description, it is possible according to the teachings of the invention implemented in the sixth embodiment to predict with improved accuracy the image fluctuation in a succeeding field by the image fluctuation predicting circuit 5 owing to the correction performed by the fractional error correcting circuit 604 on the error brought about by rounding off the fraction included in the image fluctuation information Sg1 detected by the image movement vector detecting circuit 4 between two successive fields.

It is apparent that the functions of the individual circuits constituting the image fluctuation correcting apparatus according to the sixth embodiment except for the acceleration detecting circuit can equally be realized by resorting to software technique.

In the above description of the third embodiment of the invention, it has been assumed that the image fluctuation detecting circuit 4 is constituted by a circuit known heretofore. It should however be understood that the invention is not restricted to the use of such known image fluctuation detecting circuit 4.

Although it has been described that detection of the image fluctuation and prediction thereof are performed on a field basis, the invention is not limited to this concept. Detection of the image fluctuation as well as the prediction thereof may also be performed on a frame-by-frame basis to substantially the same effect.

Embodiment 7

Next, description will be made of an embodiment of the image fluctuation correcting apparatus which implements the second aspect of the invention. This embodiment will hereinafter be referred to as the seventh embodiment. The seventh embodiment differs from the fourth embodiment described hereinbefore only in respect to the image fluctuation predicting circuit 5 shown in FIG. 10. Accordingly, the same components as those of the fourth embodiments are denoted by like reference symbols as those used in FIG. 10, and the following description will be made mainly of the arrangement which differs from the fourth embodiment.

Figure 14:
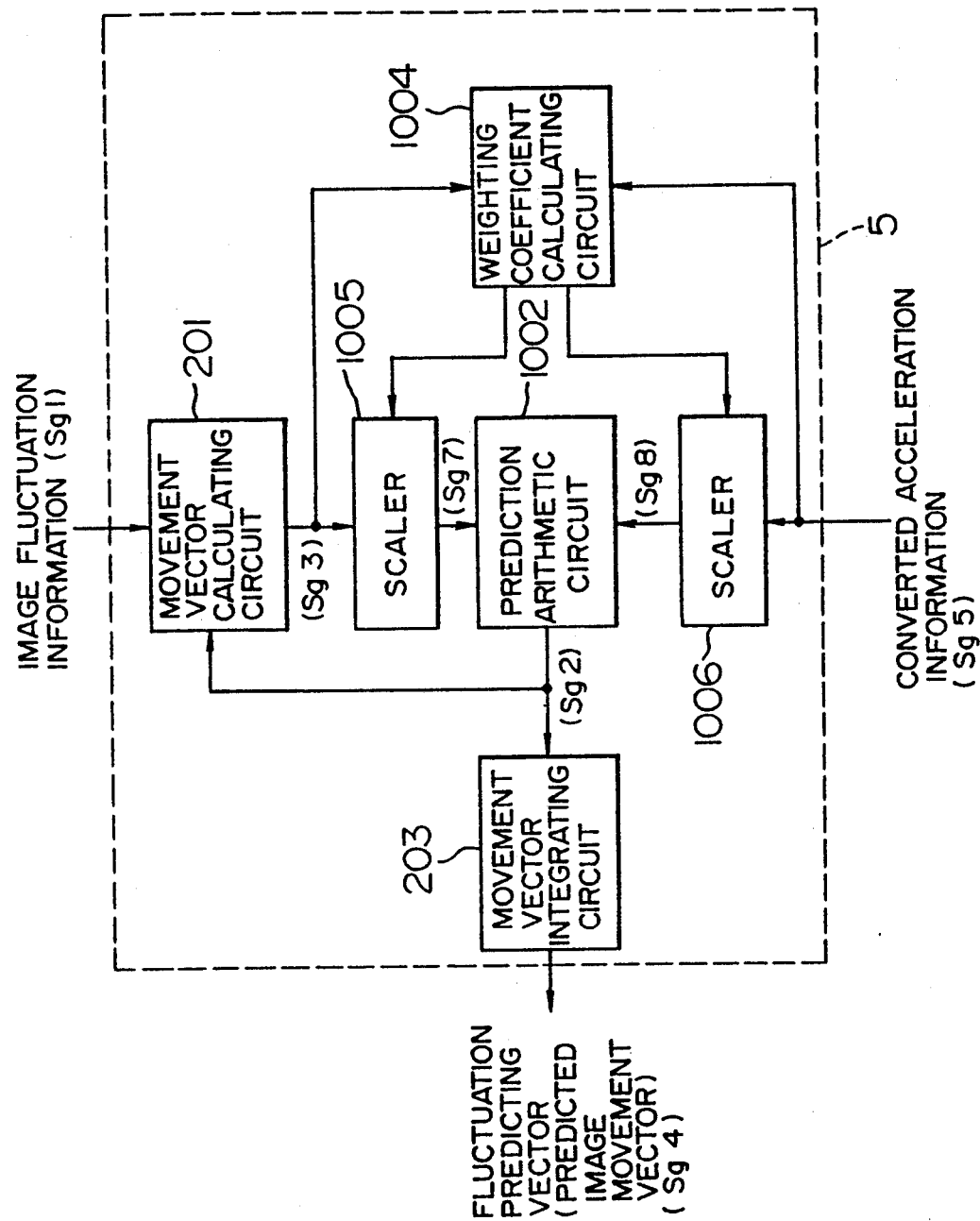
FIG. 14 is a block diagram showing an exemplary configuration of an image fluctuation predicting circuit according to a seventh embodiment implementing the second aspect of the present invention.

FIG. 14 is a block diagram showing in concrete form an exemplary structure of the image fluctuation predicting circuit 5 according to the seventh embodiment of the invention. Referring to the figure, there are provided scaler circuits 1005 and 1006 which serve to perform weighting of the outputs Sg3 and Sg5 of the movement vector calculating circuit 201 and the conversion circuit 9, respectively. A weight (coefficient) calculating circuit 1004 calculates the weighting coefficients of the scaler circuits 1005 and 1006, respectively, on the basis of the output Sg3 from the movement vector calculating circuit 201 and the output Sg5 from the conversion circuit 9. A prediction arithmetic circuit 1002 serves to predict a movement vector of a succeeding field) i.e,, a field succeeding to the current field) on the basis of the movement vector Sg7 determined by the movement vector calculating circuit 201 in the current field and weighted by the scaler circuit 1005 as well as a value Sg8 resulting from weighting of the acceleration information obtained from the conversion circuit 9 shown in fig, 10. (Hereinafter, the movement vector of the succeeding field will be referred to as the image fluctuation predicting vector Sg2.) The movement vector of concern used currently is obtained by adding to (or subtracting from) the image fluctuation prediction vector Sg2 determined by the prediction arithmetic circuit 1002 for the field immediately preceding the current field the image fluctuation information Sg1 determined by the fluctuation detecting circuit 4 one a field-by-field basis. Thus, it can be said that the movement vector mentioned above represents the actual movement vector Sg3 for each field. The actual movement vector Sg3 for each field is calculated by the vector calculating circuit 201. More specifically, the vector calculating circuit 201 stores the image fluctuation predicting vector Sg2 outputted from the prediction arithmetic circuit 1002 on a field-by-field basis and determines the actual inter-field movement vector Sg3 by using the image fluctuation predicting vector Sg2 and the image fluctuation information Sg1 outputted from the image fluctuation detecting circuit 4. A movement vector integrating circuit 203 integrates the image fluctuation predicting vector Sg2 outputted from the prediction arithmetic circuit 1002 on a field-by-field basis. (Hereinafter, the output of the movement vector integrating circuit 203 will be referred to as the fluctuation predicting integral vector Sg4.)

Now, description will be turned to operations of the image fluctuation detecting apparatus of the structure described above.

In the image fluctuation detecting circuit 4, correlation between the picture signals of a current field as outputted from the photoelectric conversion device 1 and the representative point signals of the preceding field picture signals which are stored in the representative point storing circuit 101 is determined by the correlation arithmetic circuit 102. On the basis of the result of this correlation, the image fluctuation is detected. It should be noted that the image fluctuation information Sg1 thus obtained represents a difference between the image fluctuation which has been predicted for the current field by the image fluctuation predicting circuit 5 in the preceding field and the actual image fluctuation of the current field. Consequently, when the fluctuation predicted by the image fluctuation predicting circuit 5 is the same as the actual image movement, the image fluctuation determined by the image fluctuation detecting circuit 4 is zero. The image fluctuation data Sg1 detected by the image fluctuation detecting circuit 4 is added to (or subtracted from) the image fluctuation prediction vector Sg2 determined by the vector calculating circuit 201 in the preceding field, wherein the result of this addition (or subtraction) is weighted by the scaler circuit 1005 and supplied to the prediction arithmetic circuit 1002. The prediction arithmetic circuit 1002 then determines an image fluctuation predicted for a succeeding field on the basis of the data Sg7 inputted from the scaler circuit 1005 and the acceleration information Sg8 representing the movement of the image pickup apparatus as outputted from the conversion circuit 9 and weighted by the scaler circuit, wherein the predicted image fluctuation is supplied to the movement vector integrating circuit 203 as the image fluctuation prediction Vector Sg2.

In this conjunction, the prediction arithmetic circuit 1002 is implemented in such a structure as to determine a value corresponding to acceleration determined on the basis of a difference between the movement vector in the current field at the time point when the picture signals of the succeeding field are read out, i.e., the time point when the movement vector for the succeeding field is obtained on the one hand and the movement vector for the succeeding field on the other hand (since the movement vector can be considered to be the speed of movement in each field, the difference between the movement vectors as mentioned above may be regarded as representing the acceleration) and adds the above-mentioned value to the movement vector for the current field which has been weighted by the scaler circuit 1003, wherein the sum resulting from the addition is delivered as the image fluctuation predicting vector Sg2. Parenthetically, the first mentioned value can practically be obtained by integrating the acceleration information outputted from the acceleration detecting circuit 8 over a period corresponding to one field and weighting by the scaler circuit 1006.

At that time, for determining the weighting coefficients of the scaler circuits 1005 and 1006, a coefficient calculating circuit 1004 determines difference value between the movement vectors determined up to the current time point for every field by the movement vector calculating circuit 201 and then determines ratios between the difference values thus determined and a value obtained by converting the acceleration information outputted from the acceleration detecting circuit 8 for a period corresponding to a time span for which the difference values mentioned above are determined (i.e., a value obtained by integrating the acceleration information over a period corresponding to one field in this illustrated case). The ratios thus determined are stored in the coefficient calculating circuit 1004 for thereby determining the weighting coefficients of the scaler circuits 1005 and 1006 on the basis of at least one of the ratios as stored.

By using the image fluctuation prediction vector Sg2 described above, the movement vector integrating circuit 203 determines an integral value Sg4 of the image fluctuation prediction vectors Sg2 obtained on a field-by-field basis. The fluctuation predicting integral vector Sg4 thus determined is supplied to the photoelectric conversion device control circuit 6, which then controls the start address for reading the picture signals on the photoelectric conversion device 1 on the basis of the predicting integral vector Sg4 to thereby change correspondingly the area of the photoelectric conversion device 1 from which the picture signals are to be read out. In this way, the image fluctuation component ascribable to the swing of the image pickup apparatus can be corrected on the photoelectric conversion device 1 itself.

Next, description will be made of a method of determining the weighting coefficients by the coefficient determining circuit 1004. For convenience of description, $A_n/B_n$ represent the ratios between the difference values ($A_n$) of the movement vectors between the successive fields and the value $B_n$ obtained by converting the acceleration information outputted from the acceleration detecting circuit 8 with a time span corresponding to the time for which the difference value determining operation is performed (e.g. the value $B_n$ obtained by integrating the acceleration information over a time corresponding to one field). In this case, assuming that only the ratio determined on the basis of the difference value between the movement vector in the current field and that of the immediately preceding field, the weighting coefficient of the scaler circuit 1006 is determined to be a value of the ratio obtained on the basis of the difference value between the movement vector in the current field and that of the immediately preceding field, if it is assumed for simplification that the weighting coefficient of the scaler circuit 1005 is "1". In this case, the image fluctuation predicting vector Sg2 follows rapidly changes in the value of the ratio mentioned above.

On the other hand, assuming that a mean value is determined from a plurality of the ratios $A_n/B_n$ (e.g. ten ratio values determined for ten fields, respectively) to be used as the weighting coefficient, this mean value represents the weighting coefficient of the scaler circuit 1006 on the assumption that the weighting coefficient of the scaler circuit 1005 is "1". At that time, the error components contained in the values of the ratios can be reduced by using the mean value of the ratios, whereby the image fluctuation prediction vector Sg2 as obtained can correspondingly be stabilized.

In a modification, instead of setting the period for determining the vector difference value to one field, a time span therefor may be selected equal to one frame or two fields or more, while the acceleration information outputted from the acceleration detecting circuit 8 may be integrated over a period corresponding to one frame, wherein the ratio between the difference value and the integrated acceleration information may be used for determining the weighting coefficient as described above. In this case, the error components contained in the values of the ratios are returned, whereby stabilized image fluctuation prediction vector Sg2 can be obtained.

In this conjunction, it goes without saying that the coefficient calculating circuit 1004 incorporates a memory for storing numerical Values required for determining the weighting coefficients.

As will be appreciated from the above description, it is possible to correct the image fluctuation without using the field memory circuit by changing the start address for reading out the signals on the photoelectric conversion device 1 in accordance with the predicting integral vector Sg4 for a succeeding field which vector is predicted by the movement vector predicting circuit 5.

It should be mentioned that a temporal relationship between the inter-field movement vector difference values used for determining the weighting coefficient and the value obtained by integrating the acceleration information outputted from the acceleration detecting circuit 8 over a corresponding period by the conversion circuit 9 (i.e., temporal relation between the one-field period for determining the inter-field movement vector difference and the period over which the acceleration information is integrated) is omitted from description, because the picture signals produced by the image pickup apparatus and the acceleration information outputted from the acceleration detecting circuit differ in dependence on the actually adopted circuit configuration of the signal processing system of the image pickup apparatus and that of the acceleration detecting circuit.

In conjunction with the seventh embodiment, three methods of determining the weighting coefficients have been described. It should however be understood that the invention is not restricted thereto. It is conceivable within the spirit and scope of the invention that a plurality of the ratios obtained for a plurality of fields may equally be used to substantially the same effect.

In a modification of the seventh embodiment, the integral vector correcting circuit 504 described hereinbefore in conjunction with the fifth embodiment may be additionally provided in succession to the movement vector integrating circuit 203 in the image fluctuation predicting circuit 5, to thereby correct the output of the vector integrating circuit 203 by utilizing the outputs of the movement vector calculating circuit 201 and the prediction arithmetic circuit 1002. With this arrangement, substantially the same effect as that of the fifth embodiment can be obtained.

In another version of the seventh embodiment, the fractional error correcting circuit 604 described hereinbefore in conjunction with the sixth embodiment may be additionally provided in precedence to the movement vector calculating circuit 201 in the image fluctuation predicting circuit 203 is inputted to the fractional error correcting circuit 604. With this arrangement, an advantageous effect similar to that of the sixth embodiment can be realized.

In a further modification of the seventh embodiment, the integral vector correcting circuit 504 described hereinbefore in conjunction with the fifth embodiment may be added in succession to the movement vector integrating circuit 203 in the image fluctuation predicting circuit, wherein the output of the movement vector integrating circuit 203 is corrected by utilizing the outputs of the movement vector calculating circuit 201 and the prediction arithmetic circuit 1002, while the fractional error correcting circuit 604 of the sixth embodiment is added in precedence to the vector arithmetic circuit 201 to thereby supply the output of the movement vector integrating circuit 203 to the fractional error correcting circuit 604. With this arrangement, the advantageous effects of both the fifth and sixth embodiments can simultaneously be realized.

It is also apparent that the functions of the individual circuits constituting the image fluctuation correcting apparatus according to the seventh embodiment can equally be realized by resorting to a software technique.

In the above description of the seventh embodiment of the invention, it has been assumed that the image fluctuation detecting circuit 4 is constituted by a circuit known heretofore. It should however be understood that the invention is not restricted to the use of such known image fluctuation detecting circuit 4.

Although it has been described that detection of the image fluctuation and prediction thereof are performed on a field basis, the invention is not limited to this concept. Detection of the image fluctuation as well as the prediction thereof may also be performed on a frame-by-frame basis to substantially the same effect.

We claim:

1. An image fluctuation correcting apparatus, comprising:
    an image fluctuation detecting circuit for detecting fluctuation of an input image supplied from a photoelectric conversion device to thereby output the detected fluctuation as image fluctuation information;
    an image fluctuation predicting circuit for predicting on the basis of said image fluctuation information supplied from said image fluctuation detecting circuit a predicted image movement vector of a current field or alternatively a predicted image movement vector of a succeeding frame which succeeds said current field; and
    a photoelectric conversion device control circuit for controlling signal read addresses of said photoelectric conversion device on the basis of said predicted image movement vector;
    wherein said image fluctuation predicting circuit includes:
    a movement vector calculating circuit for calculating a movement vector between a current field or frame and a preceding field or frame on the basis of the image fluctuation information obtained from said image fluctuation detecting circuit and the predicted image movement vector predicted one field or one frame before;
    a prediction arithmetic circuit for calculating a predicted image movement vector of a succeeding field or a succeeding frame on the basis of at least one of the movement vectors determined up to the current field or frame inclusive thereof by said movement vector calculating circuit; and
    a movement vector integrating circuit for integrating said predicted image movement vector obtained from said prediction arithmetic circuit to output an integral value resulting from said integration.

2. An image fluctuation correcting apparatus according to claim 1, wherein said prediction arithmetic circuit includes:

a delay circuit for delaying the input signal for a predetermined time;

a first multiplication circuit for multiplying said input signal by a coefficient;

a second multiplication circuit for multiplying an output of said delay circuit by a coefficient, and an adder for adding together the outputs of said first and second multiplication circuits.

3. An image fluctuation correcting apparatus according to claim 1, wherein said prediction arithmetic circuit includes:

a first delay circuit for delaying the input signal for a predetermined time;

a first multiplication circuit for multiplying said input signal by a coefficient;

a second multiplication circuit for multiplying an output of said delay circuit by a coefficient, and a first adder for adding together the outputs of said first and second multiplication circuits;

a second delay circuit for delaying the output signal of said first delay circuit for a predetermined time;

a third multiplication circuit for multiplying the output of said second delay circuit by a coefficient; and a second adder for adding the output of said first adder with the output of said third multiplication circuits.

4. An image fluctuation correcting apparatus according to claim 1, wherein said image fluctuation predicting circuit includes:

a movement vector calculating circuit for calculating a movement vector between a current field or frame and a preceding field or frame on the basis of the image fluctuation information obtained from said image fluctuation detecting circuit and the predicted image movement vector predicted one field or one frame before;

a prediction arithmetic circuit for calculating a predicted image movement vector of a succeeding field or a succeeding frame on the basis of at least one of the movement vectors determined up to the current field or frame inclusive thereof by said movement vector calculating circuit;

a movement vector integrating circuit for integrating said predicted image movement vector obtained from said prediction arithmetic circuit to output an integral value resulting from said integration; and an integral vector correcting circuit for correcting said integral value outputted from movement vector integrating circuit with the movement vector determined by said movement vector calculating circuit.

5. An image fluctuation correcting apparatus according to claim 1, wherein said image fluctuation predicting circuit includes:

a fractional error correcting circuit for correcting error produced upon signal reading from said photoelectric conversion device and contained in the image fluctuation information obtained from said image fluctuation detecting circuit;

a movement vector calculating circuit for calculating a movement vector between the current field or current frame and a preceding field or preceding frame on the basis of the image fluctuation information which has undergone the correction by said fractional error correcting circuit and the predicted image movement vector of the immediately preceding field or frame;

a prediction arithmetic circuit for calculating a predicted image movement vector of a succeeding field or a succeeding frame on the basis of at least one of the movement vectors determined up to the current field or frame inclusive thereof by said movement vector calculating circuit; and movement vector integrating circuit for integrating the predicted image movement vector obtained from said prediction arithmetic circuit to thereby output an integral value of said predicted image movement vector.

6. An image fluctuation correcting apparatus in an image pickup apparatus, comprising:

an image fluctuation detecting circuit for detecting fluctuation of images inputted from a photoelectric conversion device on a field-by-field basis or on a frame-by-frame basis;

an acceleration detecting circuit for detecting acceleration of movement of the image pickup apparatus to output acceleration information;

a conversion circuit for obtaining converted acceleration information from said acceleration information;

an image fluctuation predicting circuit for predicting on the basis of movement vector and said converted acceleration information an image movement vector for a field or frame which succeed a time point at which said movement vector was detected, to thereby output said predicted movement vector as a predicted image movement vector; and a photoelectric conversion device control circuit for controlling signal read addresses of said photoelectric conversion device on the basis of the predicted image movement vector outputted from said image movement predicting circuit;

wherein said image fluctuation predicting circuit includes:

a movement vector calculating circuit for calculating a movement vector between a current field or current frame and a preceding field or preceding frame on the basis of the image fluctuation information obtained from said image fluctuation detecting circuit and the predicted image movement vector predicted one field or one frame before;

a prediction arithmetic circuit for calculating a predicted image movement vector on the basis of the movement vector obtained from said movement vector calculating circuit and the converted acceleration information obtained from said conversion circuit; and a movement vector integrating circuit for integrating the predicted image movement vector obtained from said prediction arithmetic circuit to thereby output an integral value of said predicted image movement vector.

7. An image fluctuation correcting apparatus according to claim 6, wherein said conversion circuit integrates the acceleration information obtained from said acceleration for a predetermined time.

8. An image fluctuation correcting apparatus according to claim 6, wherein said conversion circuit performs gain adjustment of the acceleration information obtained from said acceleration detection circuit.

9. An image fluctuation correcting apparatus according to claim 6, wherein said conversion circuit performs both integration of the acceleration information obtained from said acceleration detecting circuit for a predetermined time and gain adjustment of said acceleration information.

10. An image fluctuation correcting apparatus, according to claim 6, wherein said image fluctuation predicting circuit includes:
- a movement vector calculating circuit for calculating a movement vector between a current field or frame and a preceding field or frame on the basis of the image fluctuation information obtained from said image fluctuation detecting circuit and the predicted image movement vector predicted one field or one frame before;
- a prediction arithmetic circuit for calculating a predicted image movement vector on the basis of at least one of the movement vectors obtained for the current field or up to the current field from said movement vector calculating circuit and the converted acceleration information obtained from said conversion circuit;
- a movement vector integrating circuit for integrating said predicted image movement vector obtained from said prediction arithmetic circuit to output an integral value resulting from said integration; and
- an integral vector correcting circuit for correcting said integral value with the movement vector obtained from said movement vector calculating circuit.

11. An image fluctuation correcting apparatus, according to claim 6, wherein said image fluctuation predicting circuit includes:
- a fractional error correcting circuit for correcting errors produced upon signal reading from said photoelectric conversion device and contained in the image fluctuation information obtained from said image fluctuation detecting circuit;
- a movement vector calculating circuit for calculating a movement vector between a preceding field or frame and a current field or frame on the basis of the image fluctuation information corrected by said fractional error correcting circuit and the predicted image movement vector predicted one field or one frame before;
- a prediction arithmetic circuit for calculating a predicted image movement vector on the basis of at least one of the movement vectors obtained for the current field or up to the current field from said movement vector calculating circuit and the converted acceleration information obtained from said conversion circuit; and
- a movement vector integrating circuit for integrating said predicted image movement vector obtained from said prediction arithmetic circuit to thereby output an integral value of said predicted image movement vector.

12. An image fluctuation correcting apparatus, according to claim 6, wherein said image fluctuation predicting circuit includes:
- a movement vector calculating circuit for calculating a movement vector between a preceding field or frame and a current field or frame on the basis of the image fluctuation information obtained from said image fluctuation detecting circuit and the predicted image movement vector predicted one field or one frame before;
- scaler circuit means for weighting the movement vector obtained from said movement vector calculating circuit and the converted acceleration information obtained from said converting circuit;
- a prediction arithmetic circuit for determining a predicted image movement vector on the basis of an output signal from said scaler circuit means;
- a weighting coefficient calculating circuit for calculating a weighting coefficient of said scaler circuit means on the basis of the movement vector determined by said movement vector calculating circuit and the converted acceleration information obtained from said converting circuit; and
- a movement vector integrating circuit for integrating the predicted image movement vector obtained from said prediction arithmetic circuit, to thereby out an integral value thereof.

13. An image fluctuation correcting apparatus, according to claim 12, wherein said weighting coefficient calculating circuit determines the weighting coefficient on the basis of the movement vector obtained from said movement vector calculating circuit within a predetermined period and the output of said converting circuit obtained therefrom within a time corresponding to said predetermined period.

14. An image fluctuation correcting apparatus, according to claim 12, wherein said weighting coefficient calculating circuit determines the weighting coefficient on the basis of at least one of ratios of differences between the movement vectors obtained from said movement vector calculating circuit in given fields or frames and the movement vectors obtained from said movement vector calculating circuit in fields or frames preceding, respectively, said given fields or frames by one field or by one frame to the outputs of said converting circuit obtained within a time corresponding to a period of said one field or said one frame on the other hand.

15. An image fluctuation correcting apparatus, according to claim 12, wherein said weighting coefficient calculating circuit determines the weighting coefficient on the basis of a ratio of a difference between the movement vector obtained from said movement vector calculating circuit in a current field or frame and the movement vector obtained from said movement vector calculating circuit in a field or frame preceding, respectively, said current field or frame by one field or by one frame to the output of said converting circuit obtained within a time corresponding to a period of said one field or said one frame.

* * * * *